United States Patent
Wheelock

(10) Patent No.: US 11,601,711 B2
(45) Date of Patent: Mar. 7, 2023

(54) ELECTRONIC DEVICE AND METHOD FOR ENABLING DOCSIS 4.0 FDD/FDX OPERATION IN HFC PLANTS

(71) Applicant: ARRIS Enterprises LLC, Suwanee, GA (US)

(72) Inventor: Ian Wheelock, Cork (IE)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/460,517

(22) Filed: Aug. 30, 2021

(65) Prior Publication Data

US 2022/0103892 A1 Mar. 31, 2022

Related U.S. Application Data

(60) Provisional application No. 63/085,586, filed on Sep. 30, 2020.

(51) Int. Cl.
*H04N 21/438* (2011.01)
*H04N 21/238* (2011.01)
*H04N 21/61* (2011.01)
*H04N 21/2383* (2011.01)

(52) U.S. Cl.
CPC ..... *H04N 21/4382* (2013.01); *H04N 21/2383* (2013.01); *H04N 21/6118* (2013.01)

(58) Field of Classification Search
CPC .......... H04N 21/4382; H04N 21/2383; H04N 21/6118
USPC .................................................. 375/240.25
See application file for complete search history.

(56) References Cited

U.S. PATENT DOCUMENTS

| 5,418,782 A * | 5/1995 | Wasilewski ...... H04N 21/23617 348/E7.071 |
| 9,743,284 B2 * | 8/2017 | Sun ........................... H04L 5/14 |
| 2007/0081537 A1 | 4/2007 | Wheelock |
| 2010/0020794 A1 * | 1/2010 | Cholas .................... H04N 5/775 370/389 |
| 2011/0197239 A1 * | 8/2011 | Schlack ............. H04N 21/2402 725/95 |
| 2015/0312599 A1 * | 10/2015 | Brockmann ....... H04N 21/6125 725/109 |

(Continued)

OTHER PUBLICATIONS

International Search Report and the Written Opinion of the International Searching Authority dated Nov. 29, 2021 in International (PCT) Application No. PCT/US2021/048152.

*Primary Examiner* — Dominic D Saltarelli
(74) *Attorney, Agent, or Firm* — Wenderoth, Lind & Ponack, L.L.P.

(57) ABSTRACT

An electronic device and method for delivering content to legacy MPEG quadrature amplitude modulation (QAM) set-top boxes (STBs) identifies a QAM channel from a bank of QAM modulator channels of the electronic device that has spare capacity to transmit a MPEG/QAM program stream for a program N, and a unique MPEG program number corresponding to the program N, joins an IP multicast from a broadband network that includes the program N, and sets up QAM modulation to send the program N on a target frequency corresponding to the identified QAM channel, transmits the target frequency to the STBs, and transmits the MPEG/QAM program stream for the program N to the STBs on the target frequency corresponding to the identified QAM channel.

28 Claims, 10 Drawing Sheets

(56) References Cited

U.S. PATENT DOCUMENTS

| | | | |
|---|---|---|---|
| 2016/0037187 A1* | 2/2016 | Das | H04L 65/611 |
| | | | 725/62 |
| 2016/0286247 A1* | 9/2016 | Phillips | H04N 21/2662 |
| 2016/0295251 A1* | 10/2016 | Cloonan | H04N 21/615 |
| 2017/0251242 A1* | 8/2017 | Wang | H04N 21/4532 |
| 2018/0316979 A1 | 11/2018 | Brooks et al. | |

* cited by examiner

ELECTRONIC DEVICE AND METHOD FOR ENABLING DOCSIS 4.0 FDD/FDX OPERATION IN HFC PLANTS

BACKGROUND

Existing hybrid fiber coaxial (HFC) networks continue to require MPEG video delivery over quadrature amplitude modulation (QAM) to support legacy MPEG set-top box (STB) devices, with a large portion of the HFC spectrum being occupied (100s of MHz of bandwidth). However, this substantially limits deployment of DOCSIS 3.1, and is also a barrier to deploying D4.0 FDD/Full Duplex (FDD/FDX) service. Currently, adoption of DOCSIS 4.0 deployment requires the removal of MPEG/QAM services from the HFC network in order to ensure the operation of FDD/Full Duplex (FDX) DOCSIS operation. This is because the MPEG/QAM services are typically presented right in the middle of the actual FDD spectrum (e.g., in between 100 MHz and 500 MHz).

One current solution to the problem of enabling DOCSIS 4.0 FDD/FDX operation could involve multiple system operators (MSOs) abandoning their legacy MPEG2-TS/QAM STB deployments (i.e., turning off, disabling, and removing the legacy MPEG/QAM services from the HFC network), and embarking on a costly upgrade to a 100% Internet Protocol Television (IPTV) deployment as an alternative. However, broadband is a major revenue earner for MSOs with the massive deployments of existing legacy MPEG2-TS/QAM based STBs in the network and MPEG2-TS being among the cheapest video delivery systems for MSOs. On the other hand, the upgrade to IPTV deployments will require significant capital investment (e.g., IPTV switchover requires massive headend infrastructure, and widespread replacement of existing MPEG2-TS STBs), and operators may be reluctant to abandon their massive investment in existing legacy STB/MPEG technologies in favor of an IPTV switchover. Therefore, the IPTV switchover will not happen rapidly and will require concurrent carriage of both MPEG2-TS service and IPTV service until the full transition to IPTV is complete.

Another possible solution is an IP/QAM frequency shifting scheme, which involves downconverting and upconverting frequency (e.g., between 100 MHz and 1.2 GHz). Although this possible solution may work for one or two signals, it is insufficient in the case of many signals (e.g., occupying 100s of MHz).

SUMMARY

Accordingly, there is a need to provide a residential gateway device in the home that is enabled for DOCSIS 4.0 FDD/FDX service on HFC networks while preserving (maintaining, enabling continued use of) legacy MPEG2-TS based QAM STB service for operators. The proposed solutions described herein provide the ability to completely remove all of the MPEG/QAM spectrum (channels) from the HFC network.

An aspect of the present disclosure provides an electronic device for delivering content to legacy MPEG quadrature amplitude modulation (QAM) set-top boxes (STBs), including a memory storing instructions, and a processor configured to execute the instructions to identify a QAM channel from a bank of QAM modulator channels of the electronic device that has spare capacity to transmit a MPEG/QAM program stream for a program N, and a unique MPEG program number corresponding to the program N, join an IP multicast from a broadband network that includes the program N, and set up QAM modulation to send the program N on a target frequency corresponding to the identified QAM channel, transmit the target frequency to the STBs, and transmit the MPEG/QAM program stream for the program N to the STBs on the target frequency corresponding to the identified QAM channel.

In an aspect of the present disclosure, the electronic device receives a request from one of the STBs to deliver the MPEG/QAM program stream for the program N on a preferred frequency, wherein the target frequency sent by the electronic device corresponds to a same QAM channel as the preferred frequency requested by the one of the STBs in a condition that the preferred frequency has enough spare capacity to transmit the MPEG/QAM program stream.

In an aspect of the present disclosure, the electronic device receives a request from one of the STBs to deliver the MPEG/QAM program stream for the program N on a preferred frequency, wherein the target frequency sent by the electronic device corresponds to an available QAM channel that is different from the preferred frequency requested by the one of the STBs in a condition that the preferred frequency does not have enough spare capacity to transmit the MPEG/QAM program stream.

In an aspect of the present disclosure, the electronic device is remotely controlled or configured locally to deliver a defined set of "always on" channels to the STBs over an RF f-connector for an in-home QAM/RF network, without requiring a request from the STBs, and transmit an update for the defined set of "always on" channels to the STBs via a wired/wireless local area network (LAN) interface in response to a change in an MPEG/QAM channel lineup.

In an aspect of the present disclosure, the electronic device is a DOCSIS gateway device, the broadband network is an HFC network, and the electronic device further comprises a first RF f-connector for the HFC network, wherein the electronic device communicates with a cable modem termination system (CMTS) over the HFC network via the first RF f-connector to receive MPEG/IP single program transport streams (SPTSs) or a multi program transport stream (MPTS) from the IP multicast, a multiplexer configured to multiplex the received MPEG/IP STPSs into a final MPTS directed to one or more QAM channels, a QAM modulator configured to modulate and upconvert the received MPTS or the final MPTS on the one or more QAM channels, and a second RF f-connector for an in-home QAM/RF network, wherein electronic device is configured to transmit the one or more QAM channels output from the QAM modulator to the STBs over the in-home QAM/RF network via the second RF f-connector.

In an aspect of the present disclosure, the electronic device is an xPON gateway device, and the broadband network is an xPON, and the electronic device further comprises a fiber optic link for the xPON, wherein the electronic device communicates with an optical line terminal (OLT) over the xPON via the fiber optic link to receive MPEG/IP single program transport streams (SPTSs) or multi program transport streams (MPTSs) from the IP multicast, a multiplexer configured to multiplex the received MPEG/IP STPSs into a final MPTS directed to one or more QAM channels, a QAM modulator configured to modulate and upconvert the received MPTS or the final MPTS on the one or more QAM channels, and an RF f-connector for an in-home QAM/RF network, wherein the electronic device is configured to transmit the one or more QAM channels output from the QAM modulator to the STBs over the in-home QAM/RF network via the RF f-connector.

In an aspect of the present disclosure, the electronic device is a standalone (non-DOCSIS) electronic device, the broadband network is an HFC network, and the electronic device further comprises a wired/wireless local area network (LAN) interface including one or more Ethernet ports, one or more Wi-Fi radios, or combinations thereof, wherein the electronic device communicates with a DOCSIS gateway device, which communicates with a cable modem termination system (CMTS) via the HFC network, over the LAN via the wired/wireless LAN interface to receive MPEG/IP single program transport streams (SPTSs) or a multi-program transport stream (MPTS) from the IP multicast, a multiplexer configured to multiplex the received MPEG/IP SPTSs into a final MPTS directed to one or more QAM channels, a QAM modulator configured to modulate and upconvert the received MPTS or the final MPTS on the one or more QAM channels, and an RF f-connector for an in-home QAM/RF network, wherein the electronic device is configured to transmit the one or more QAM channels output from the QAM modulator to the STBs over the in-home QAM/RF network via the RF f-connector.

In an aspect of the present disclosure, the electronic device is a standalone (non-xPON) electronic device, and the broadband communication network is an xPON, and the electronic device further comprises a wired/wireless local area network (LAN) interface including one or more Ethernet ports, one or more Wi-Fi radios, or combinations thereof, wherein the electronic device communicates with an optical network terminal (ONT), which communicates with an optical line terminal (OLT) via the xPON, over the LAN via the wired/wireless LAN interface to receive MPEG/IP single program transport streams (SPTSs) or a multi program transport stream (MPTS) from the IP multicast, a multiplexer configured to multiplex the received MPEG/IP SPTSs into a final MPTS directed to one or more QAM channels, a QAM modulator configured to modulate and upconvert the received MPTS or the final MPTS on the one or more QAM channels, and an RF f-connector for an in-home QAM/RF network, wherein electronic device is configured to transmit the one or more QAM channels output from the QAM modulator to the STBs over the in-home QAM/RF network via the RF f-connector.

An aspect of the present disclosure provides a method for delivering content to legacy MPEG/QAM set-top boxes (STBs) by an electronic device, the method including identifying a QAM channel from a bank of QAM modulator channels of the electronic device that has spare capacity to transmit a MPEG/QAM program stream for a program N, and a unique MPEG program number corresponding to the program N, joining an IP multicast from a broadband network that includes the program N, and setting up QAM modulation to send the program N on a target frequency corresponding to the identified QAM channel, transmitting the target frequency to the STBs, and transmitting the MPEG/QAM program stream for the program N to the STBs on the target frequency corresponding to the identified QAM channel.

In an aspect of the present disclosure, the method further includes various steps, such as the operations performed by the electronic device as described above.

An aspect of the present disclosure provides a non-transitory computer-readable medium storing instructions for delivering content to legacy MPEG/QAM set-top boxes (STBs), the instructions when executed by a processor of an electronic device causing the electronic device to perform various steps, such as the operations performed in the method and/or by the electronic device as described above.

An aspect of the present disclosure provides an electronic device for delivering content to digital video broadcasting (DVB) or advanced television systems committee (ATSC) set-top boxes (STBs). The electronic device may perform a similar method in the case of DVB modulation (in Europe) or ATSC modulation (in United States) as discussed above for the case of QAM modulation.

With the proposed solutions according to various aspects of the present disclosure, the legacy MPEG2-TS/QAM service can be removed from HFC channels by using on-demand distribution of MPEG2-TS single program transport streams (SPTS) over DOCSIS to in-home QAM, thereby allowing legacy content to be delivered to MPEG/QAM STBs while also enabling DOCSIS 3.1 and D4.0 FDD/FDX network expansion. The proposed solutions described herein provide availability of pre-encrypted per-program MPEG2-TS SPTS streams and program-specific information/service information (PSI/SI) streams over multicast IP/UDP, to be delivered over DOC SIS.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples and not for the purpose of limiting the present disclosure as defined by the appended claims and their equivalents. The words and phrases used in the following description and claims are merely used to enable a clear and consistent understanding of the present disclosure. In addition, descriptions of well-known structures, functions, and configurations may be omitted for clarity and conciseness. Those of ordinary skill in the art will recognize that various changes and modifications of the examples described herein can be made without departing from the spirit and scope of the present disclosure.

It should be appreciated that various example embodiments of inventive concepts disclosed herein are not limited to specific numbers or combinations of devices, and there may be one or multiple of some of the aforementioned electronic apparatuses in the system, which may itself consist of multiple communication networks and various known or future developed wireless connectivity technologies, protocols, devices, and the like.

Figure 1:
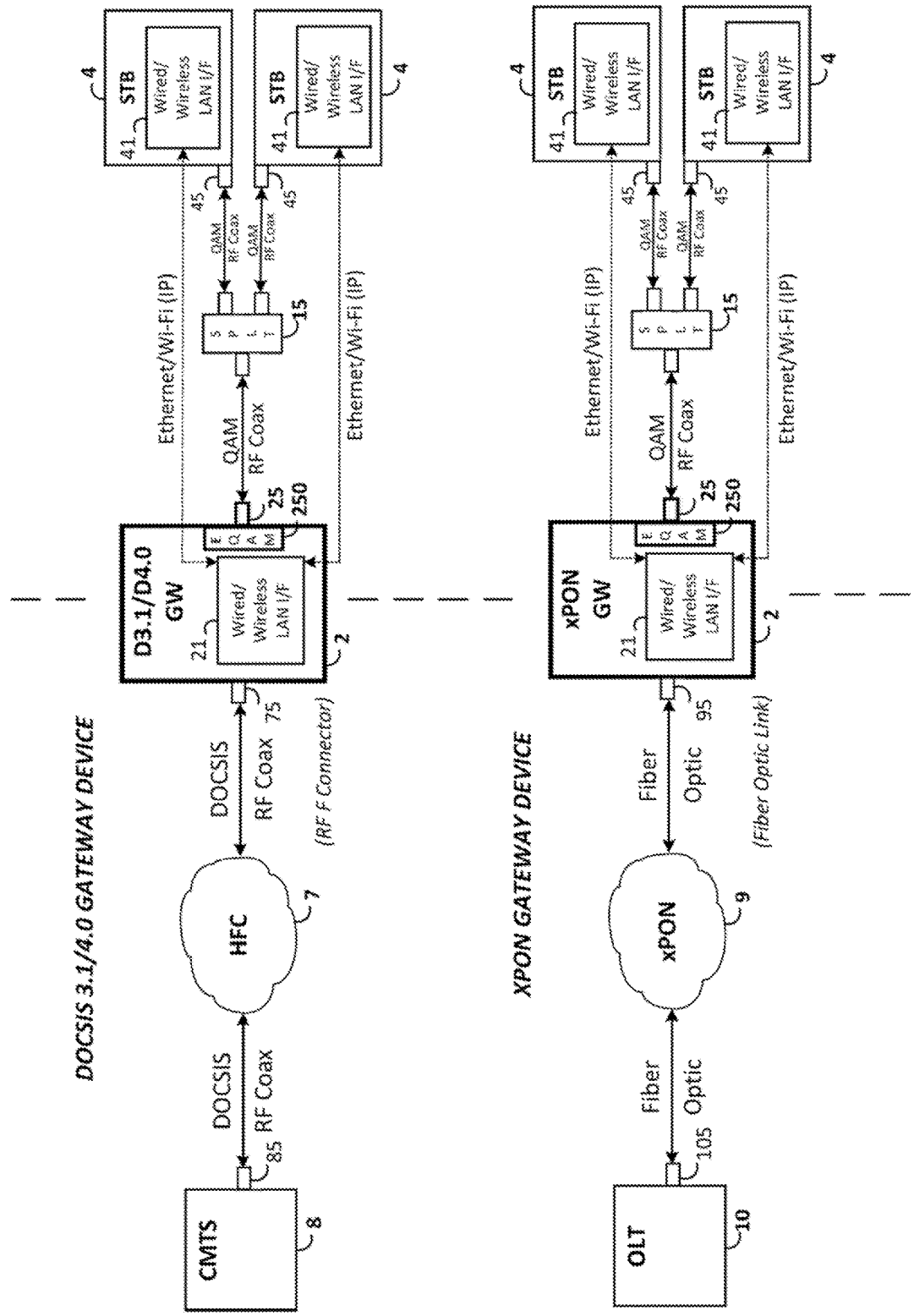
FIG. 1 is a schematic diagram of a system including a DOCSIS 3.1/4.0 gateway device or an xPON gateway device, according to some example embodiments of the present disclosure.

FIG. 1 is a schematic diagram of a system including a DOCSIS 3.1/4.0 gateway device 2 or an xPON gateway device 2, according to some example embodiments of the present disclosure.

As shown in the upper portion of FIG. 1, in the case of a HFC/DOCSIS network, the main elements of the system may include a DOCSIS 3.1/4.0 gateway device 2, multiple set-top boxes (STBs) 4, a hybrid fiber coaxial (HFC) network 7, and a cable modem termination system (CMTS) 8.

As shown in the lower portion of FIG. 1, in the case of an xPON, the main elements of the system may include an xPON gateway device 2, multiple set-top boxes (STBs) 4, a passive optical network (xPON) 9, and an optical line terminal (OLT) 10. The main difference is the inclusion of fiber optic links 95 in the xPON gateway device 2 (instead of the RF f-connector 75 of the DOCSIS gateway device 2), the use of fiber optic cables (instead of the RF coaxial cables of the HFC network), and the presence of the OLT 10 (instead of the CMTS 8).

The connections and communication technologies between the xPON gateway device 2 and the STBs 4 are the same or similar to those between the DOCSIS gateway device 2 and the STBs 4.

In either case, the gateway device 2 receives video streams over the broadband network (HFC or xPON) via the cables (RF coax, fiber optic) and connectors (75, 95) shown on the left side of FIG. 1, and delivers modulated video streams to the STBs 4 over an in-home QAM/RF network via the RF coaxial cables and RF f-connectors (25, 45) shown on the right side of FIG. 1. In particular, the gateway device 2 may include a mini "Edge" QAM (EQAM) 250 coupled to an RF f-connector 25 for the in-home QAM/RF network, for performing QAM modulation for a received MPEG video stream. If there are multiple STBs 4 present in the subscriber's home, a splitter 15 may be included in the system to transmit the QAM/RF signals to each of the multiple STBs 4. Although only two STBs are shown in the exemplary system of FIG. 1, the number of STBs 4 shown and corresponding configuration of the splitter 15 are not intended to be limiting (e.g., there may be only one STB 4 in the LAN and no splitter 15, or there could be three or more STBs 4 in the LAN with a corresponding splitter 15).

The DOCSIS gateway device 2 or the xPON gateway device 2 can be, for example, a hardware electronic device that may be a combination modem and network gateway device that combines the functions of a modem, an access point (AP), and/or a router for providing content received from the broadband network (HFC, x PON) to network devices such as the STBs 4 in the system. It is also contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The gateway device 2 may also be referred to as a residential gateway (RG), a broadband access gateway, a home network gateway, a home router, or a wireless access point (AP).

The gateway device 2 may further include a wired/wireless local area network (LAN) interface 21, which may include one or more wired communication interfaces (e.g., Ethernet port(s)) and/or one or more wireless communication interfaces (e.g., Wi-Fi radio(s)). The wireless communication interface(s) may include one or more of a 2.4 GHz radio, a 5 GHz radio, a 6 GHz radio, and/or a 60 GHz radio, for example. Thus, the gateway device 2 can also communicate with a wired/wireless LAN interface 41 of the STBs 4 using Internet Protocol (IP) communication, such as Ethernet or IEEE 802.11 Wi-Fi protocols, via the wired/wireless LAN interface 21.

In some example embodiments, a connection to the Internet can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example. The connection can further include as some portion thereof a broadband mobile phone network connection, an optical network connection, or other similar connections. For example, the connection can also be implemented using a fixed wireless connection that operates in accordance with, but is not limited to, 3rd Generation Partnership Project (3GPP) Long Term Evolution (LTE) or 5G protocols. It is also contemplated by the present disclosure to provide connections between the gateway device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The client devices of the LAN can be set-top boxes (STBs) 4, such as IP/QAM STBs capable of decoding audio/video content, and playing over OTT or MSO provided content received through the gateway device 2. The STBs 4 may include a wired/wireless LAN interface 41 and have an IP connection, such as a wired connection (Ethernet) or a wireless connection (Wi-Fi), with the wired/wireless LAN interface 21 of the gateway device 2. In addition, the STBs 4 may include an RF f-connector 45 that enables the STBs 4 to receive MPEG/QAM video streams from the gateway device 2 over an in-home QAM/RF network via RF coaxial cable (and possibly the splitter 15 in the case of multiple STBs 4).

However, the LAN may also include additional client devices not shown in FIG. 1 such as, for example, hand-held computing devices, personal computers, electronic tablets, smart phones, smart speakers, Internet-of-Things (IoT) devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the gateway device 2. Additionally, the client devices of the LAN can be a smart television (TV) or a streaming media decoder (SMD) that is capable of decoding audio/video content, and playing over OTT or MSO provided content received through the gateway device 2.

A more detailed description of the exemplary internal components of the gateway device 2 shown in FIG. 1 will be provided in the discussion of FIG. 3 below. However, in general, it is contemplated by the present disclosure that the gateway device 2 includes electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the gateway device 2 may be adapted to execute any operating system, including Linux, UNIX, Windows, MacOS, DOS, and ChromOS as well as virtual machines adapted to virtualize execution of a particular operating system, including customized and proprietary operating systems. The gateway device 2 is further equipped with components to facilitate communication with other computing devices over the one or more network connections to local and wide area networks, wireless and wired networks, public and private networks, and any other communication network enabling communication in the system.

Figure 2:
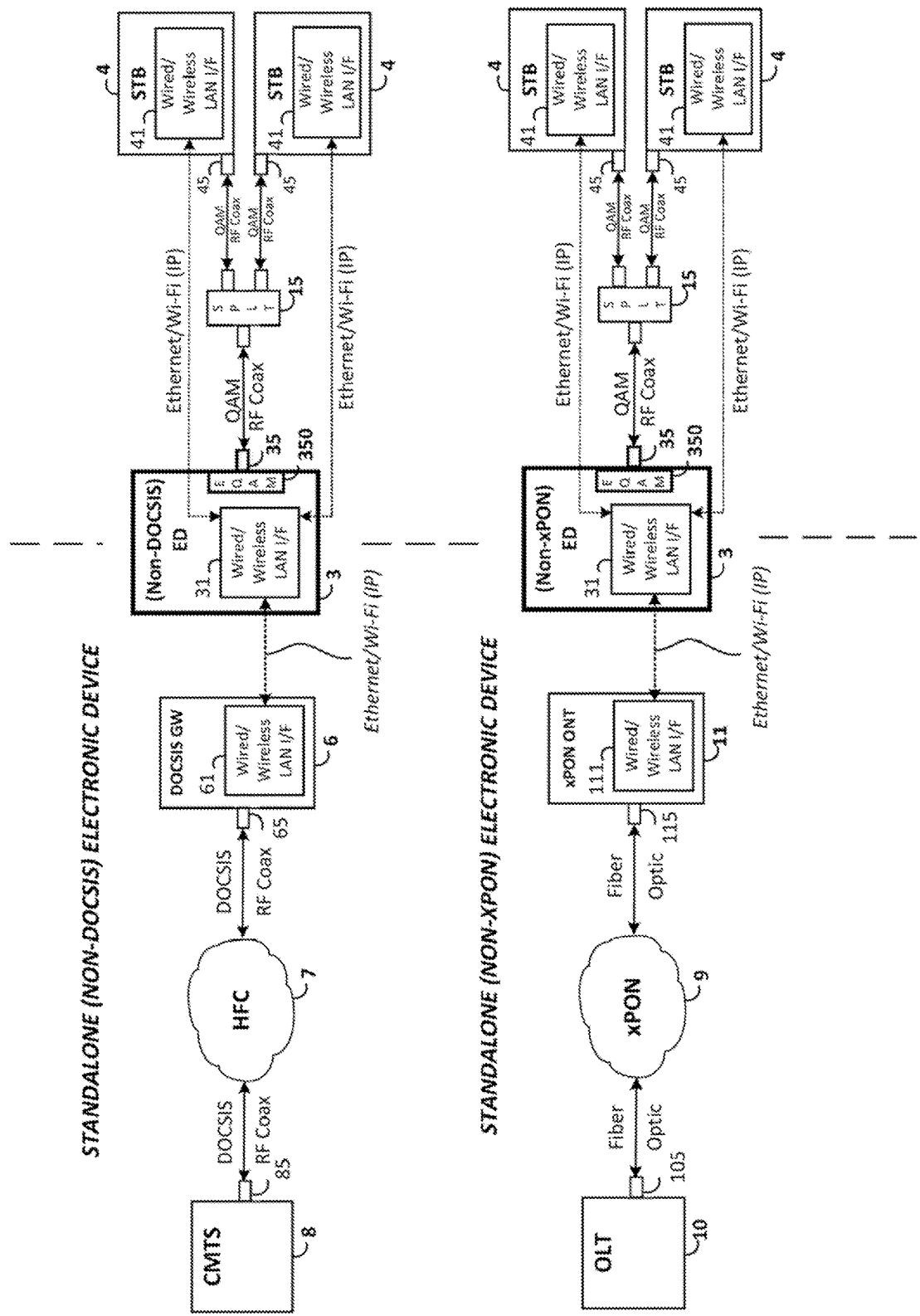
FIG. 2 is a schematic diagram of a system including a standalone (non-DOCSIS) electronic device or a standalone (non-xPON) electronic device, according to some example embodiments of the present disclosure.

FIG. 2 is a schematic diagram of a system including a standalone (non-DOCSIS) electronic device 3 or a standalone (non-xPON) electronic device 3, according to some example embodiments of the present disclosure.

In an additional or alternative example embodiment, the inventive concepts described herein may be implemented in a standalone electronic device 3 (separate and distinct from a DOCSIS gateway device or an xPON gateway device). Aspects of the present disclosure set forth above with reference to the gateway device 2 of FIG. 1 that apply similarly for the standalone electronic device 3 of FIG. 2 with not be discussed in detail for brevity, with some notable distinctions between the systems of FIG. 1 and FIG. 2 being described below.

As shown in the upper portion of FIG. 2, in the case of a HFC/DOCSIS network, the main elements of the system may include a standalone (non-DOCSIS) electronic device 3, multiple set-top boxes (STBs) 4, a hybrid fiber coaxial (HFC) network 7, and a cable modem termination system (CMTS) 8. In addition, the system includes a DOCSIS gateway device 6, which may be an existing residential gateway in the subscriber's home, for example.

As shown in the lower portion of FIG. 2, in the case of an xPON, the main elements of the system may include a standalone (non-xPON) electronic device 3, multiple set-top boxes (STBs) 4, a passive optical network (xPON) 9, and an optical line terminal (OLT) 10. In addition, the system includes an xPON optical network terminal (ONT) 11, which may be an existing residential gateway in the subscriber's home, for example. The xPON ONT 11 may also be referred to as an optical network unit (ONU) or an xPON gateway device.

However, in contrast to the system of FIG. 1, the standalone electronic device 3 of FIG. 2 does not interface with the CMTS 8 or the OLT 10 directly over the broadband network (HFC 7 or xPON 9) via the RF coaxial cable or the fiber optic cable. Instead, the wired/wireless LAN interface 31 of the standalone electronic device 3 interfaces with an intermediate network device, such as a wired/wireless LAN interface 61 of a DOCSIS gateway device 6 in the case of the HFC network 7 or a wired/wireless LAN interface 111 of an xPON ONT 11 in the case of the xPON 9, via an IP connection such as a wired (Ethernet) connection or a wireless (Wi-Fi) connection. In this example embodiment, the standalone (non-DOCSIS) electronic device 3 does not include an RF f-connector for interfacing with the HFC network 7 directly, like with the DOCSIS gateway device 2 of FIG. 1. Instead, the DOCSIS gateway device 6 of FIG. 2 includes such an RF f-connector 65 to connect with the CMTS 8 over the HFC 7 via RF coaxial cable. Similarly, the standalone (non-xPON) electronic device 3 does not include an optical fiber link for interfacing with the xPON directly, like with the xPON gateway device 2 of FIG. 1. Instead, the xPON ONT 11 of FIG. 2 includes such an optical fiber link 115 to connect with the OLT 10 over the xPON 9 via fiber optic cable.

In this manner, various other types of electronic devices may be configured with appropriate hardware and software to implement the inventive concepts described herein, without requiring modification of existing residential gateways or other broadband access network devices connecting STBs 4 to the Internet and video streaming services.

The connections and communication technologies between the standalone electronic device 3 and the STBs 4 in FIG. 2 are the same or similar to those described above with respect to the gateway device 2 and the STBs 4 in FIG. 1.

In either case, the DOC SIS gateway device 6 or the xPON ONT 11 receives video streams over the broadband network (HFC 7 or xPON 9) via the cables (RF coax, fiber optic) and connectors (65, 115) shown on the left side of FIG. 2, transmits the received video streams to the standalone (non-DOCSIS or non-xPON) electronic device 3, which then delivers modulated video streams to the STBs 4 over an in-home QAM/RF network via the RF coaxial cables and RF f-connectors (35, 45) shown on the right side of FIG. 2. In particular, the standalone electronic device 3 may include a mini "Edge" QAM (EQAM) 350 coupled to an RF f-connector 35 for the in-home QAM/RF network, for performing QAM modulation for a received MPEG video stream. If there are multiple STBs 4 present in the subscriber's home, a splitter 15 may be included in the system to transmit the QAM/RF signals to each of the multiple STBs 4. Although only two STBs are shown in the exemplary system of FIG. 2, the number of STBs 4 shown and corresponding configuration of the splitter 15 are not intended to be limiting (e.g., there may be only one STB 4 in the LAN and no splitter 15, or there could be three or more STBs 4 in the LAN with a corresponding splitter 15).

The standalone electronic device 3 may further include a wired/wireless local area network (LAN) interface 31, which may include one or more wired communication interfaces (e.g., Ethernet port(s)) and/or one or more wireless communication interfaces (e.g., Wi-Fi radio(s)). The wireless communication interfaces may include one or more of a 2.4 GHz radio, a 5 GHz radio, a 6 GHz radio, and/or a 60 GHz radio, for example. Thus, the standalone electronic device 3 can also communicate with a wired/wireless LAN interface 41 of the STBs 4 using Internet Protocol (IP) communication, such as Ethernet or Wi-Fi, via the wired/wireless LAN interface 31.

Figure 3:
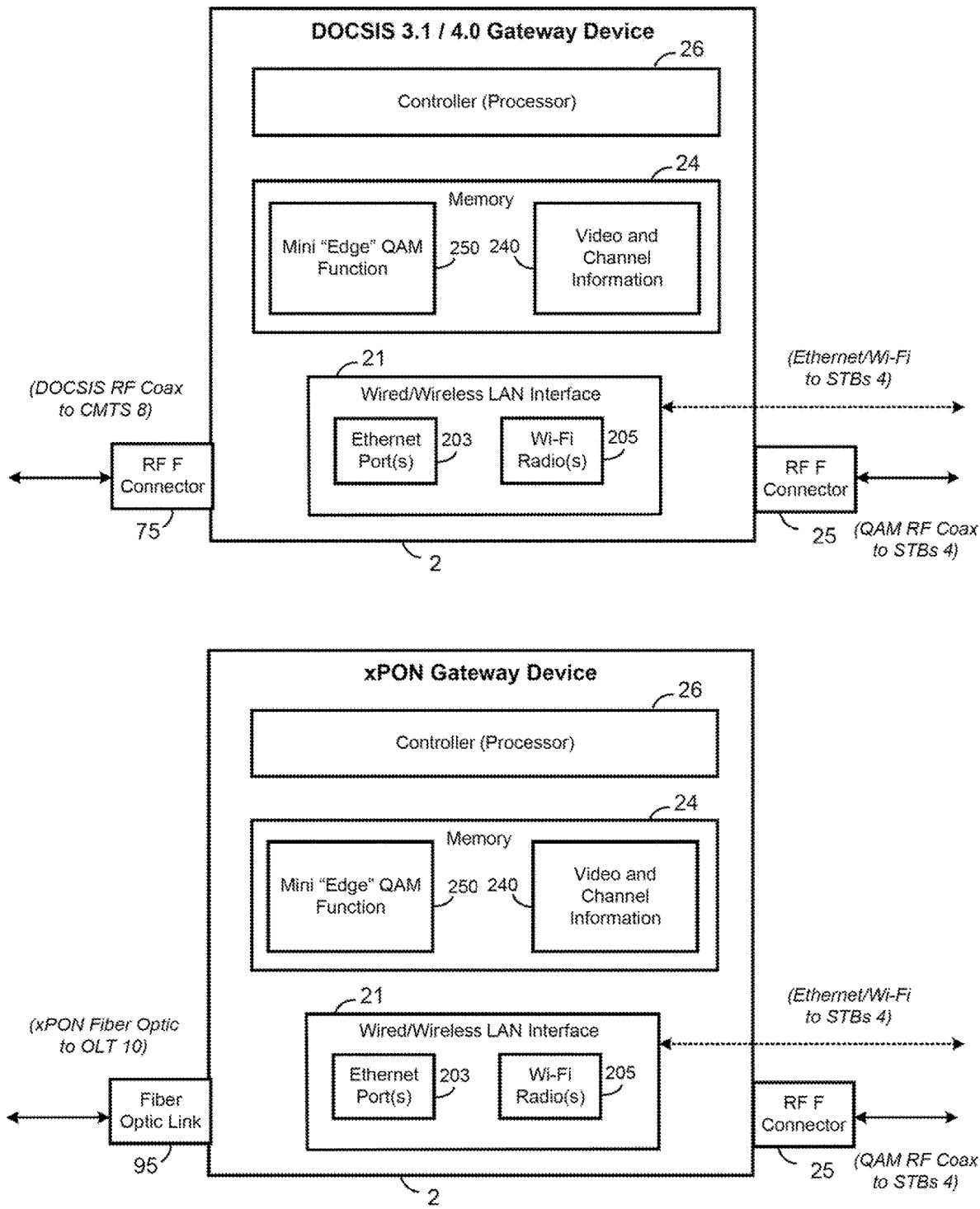
FIG. 3 is a more detailed block diagram illustrating various components of an exemplary DOCSIS 3.1/4.0 gateway device or an exemplary xPON gateway device implemented in the system of FIG. 1 according to some example embodiments of the present disclosure.

FIG. 3 is a more detailed block diagram illustrating various components of an exemplary DOCSIS 3.1/4.0 gateway device 2 or an exemplary xPON gateway device 2 implemented in the system of FIG. 1 according to some example embodiments of the present disclosure.

The gateway device 2 can be, for example, a hardware electronic device that can combine the functions of a modem, an access point (AP), and/or a router for providing content received from the broadband network to network devices such as the STBs 4 (or smart TVs, or the like) in the system. It is also contemplated by the present disclosure that the gateway device 2 can include the function of, but is not limited to, an IP/QAM STB or SMD that is capable of decoding audio/video content, and playing OTT or MSO provided content.

As shown in FIG. 3, the gateway device 2 includes a wired/wireless LAN interface 21, a memory 24, and a controller (processor) 26. In particular, the DOCSIS 3.1/4.0 gateway device 2 includes an RF f-connector 75 for the broadband network (HFC 7 to CMTS 8 over RF coaxial cable), and an RF f-connector 25 for an in-home QAM/RF network (to STBs 4 over RF coaxial cable). On the other hand, however, the xPON gateway device 2 includes a fiber optic link 95 for the broadband network (xPON 9 to OLT 10 over fiber optic cable), and an RF f-connector 25 for an in-home QAM/RF network (to STBs 4 over RF coaxial cable).

The wired/wireless LAN interface 21 may include various network cards, and circuitry implemented in software and/or hardware to enable communications with the STBs 4 using the communication protocols in accordance with connections described with reference to FIG. 1. For example, the network interface 21 can include one or more Ethernet port(s) 203 (also referred to as a LAN interface) and one or more Wi-Fi radio(s) 205 or sets of radios (e.g., a 2.4 GHz, 5 GHz, 6 GHz, and/or 60 GHz, also referred to as WLAN interfaces).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software, or algorithm including software and data (e.g., Mini "Edge" QAM function 250, video and channel information 240) for controlling the general functions and operations of the gateway device 2 and performing management functions related to the other devices (e.g., the STBs 4) in the network in accordance with the embodiments described in the present disclosure.

The controller (processor) 26 controls the general operations of the gateway device 2 as well as performs management functions related to the other devices (e.g., STBs 4) in the network. The controller 26 may also be referred to as a gateway access point (AP) wireless resource controller. The controller 26 can include, but is not limited to, a central processing unit (CPU), a hardware microprocessor, a hardware processor, a multi-core processor, a single core processor, a FPGA, a microcontroller, an ASIC, a DSP, or other similar processing device capable of executing any type of instructions, algorithms, or software including the software (250) and data (240) for controlling the operation and functions of the gateway device 2 in accordance with the embodiments described in the present disclosure.

As mentioned above, there is a need to provide a residential gateway device in the home that is enabled for DOCSIS 4.0 FDD/FDX service on HFC networks while preserving (maintaining, enabling continued use of) legacy MPEG2-TS based QAM STB service for operators. The proposed solutions described herein provide the ability to completely remove all of the MPEG/QAM spectrum (channels) from the HFC network. The legacy MPEG2-TS/QAM service can be removed from HFC channels by using on-demand distribution of MPEG2-TS single program transport streams (SPTS) over DOCSIS to in-home QAM, thereby allowing legacy content to be delivered to MPEG/QAM STBs while also enabling DOCSIS 3.1 and D4.0 FDD/FDX network expansion. The proposed solutions described herein provide availability of pre-encrypted per-program MPEG2-TS SPTS streams and program-specific information/service information (PSI/SI) streams over multicast IP/UDP, to be delivered over DOCSIS.

Figure 4:
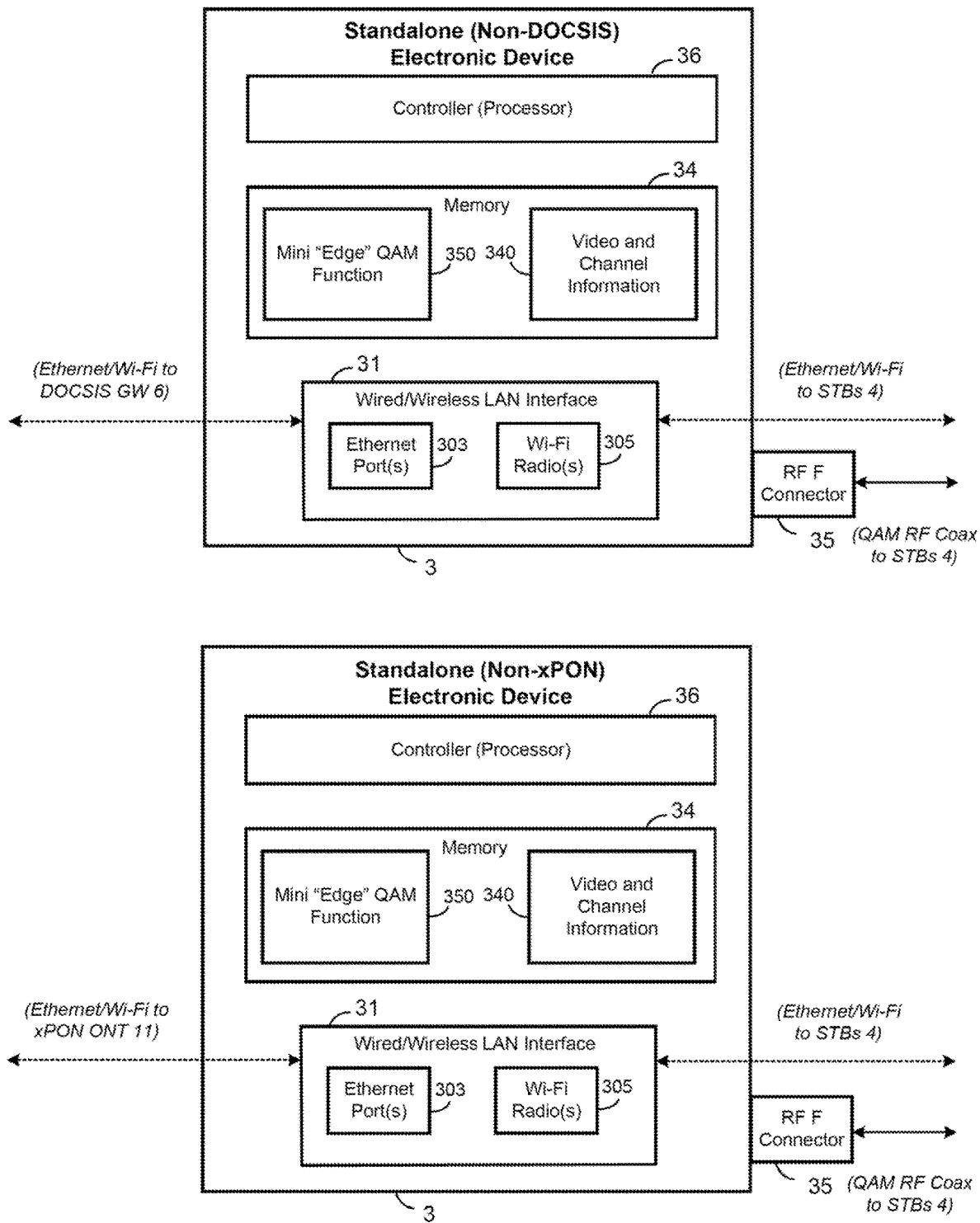
FIG. 4 is a more detailed block diagram illustrating various components of an exemplary standalone (non-DOCSIS) electronic device or an exemplary standalone (non-xPON) electronic device implemented in the system of FIG. 2 according to some example embodiments of the present disclosure.

FIG. 4 is a more detailed block diagram illustrating various components of an exemplary standalone (non-DOCSIS) electronic device 3 or an exemplary standalone (non-xPON) electronic device 3 implemented in the system of FIG. 2 according to some example embodiments of the present disclosure.

The electronic device 3 can be, for example, a hardware electronic device that can provide content received from the broadband network to network devices such as the STBs 4 (or smart TVs, or the like) in the system. It is also contemplated by the present disclosure that the electronic device 3 can include the function of, but is not limited to, an IP/QAM STB or SMD that is capable of decoding audio/video content, and playing OTT or MSO provided content.

As shown in FIG. 4, the standalone electronic device 3 includes a wired/wireless LAN interface 31, a memory 34, and a controller (processor) 36. In particular, the standalone (non-DOCSIS) electronic device 3 does not include an RF f-connector for the broadband network (and instead, uses an IP connection such as Ethernet/Wi-Fi to DOCSIS gateway device 6, and then HFC 7 to CMTS 8 over RF coaxial cable), and includes an RF f-connector 35 for an in-home QAM/RF network (to STBs 4 over RF coaxial cable). On the other hand, however, the standalone (non-xPON) electronic device 3 does not include a fiber optic link for the broadband network (and instead, uses an IP connection such as Ethernet/Wi-Fi to ONT 11, and then xPON 9 to OLT 10 over fiber optic cable), and an RF f-connector 35 for an in-home QAM/RF network (to STBs 4 over RF coaxial cable).

The wired/wireless LAN interface 31 may include various network cards, and circuitry implemented in software and/or hardware to enable communications with the STBs 4 using the communication protocols in accordance with connections described with reference to FIG. 2. For example, the network interface 31 can include one or more Ethernet port(s) 303 (also referred to as a LAN interface) and one or more Wi-Fi radio(s) 305 or sets of radios (e.g., a 2.4 GHz, 5 GHz, 6 GHz, and/or 60 GHz, also referred to as WLAN interfaces).

The memory 34 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software, or algorithm including software and data (e.g., Mini "Edge" QAM function 350, video and channel information 340) for controlling the general functions and operations of the electronic device 3 and performing management functions related to the other devices (e.g., the STBs 4) in the network in accordance with the embodiments described in the present disclosure.

The controller (processor) 36 controls the general operations of the electronic device 3 as well as performs management functions related to the other devices (e.g., STBs 4) in the network. The controller 36 may also be referred to as a gateway access point (AP) wireless resource controller. The controller 36 can include, but is not limited to, a central processing unit (CPU), a hardware microprocessor, a hardware processor, a multi-core processor, a single core processor, a FPGA, a microcontroller, an ASIC, a DSP, or other similar processing device capable of executing any type of instructions, algorithms, or software including the software (350) and data (340) for controlling the operation and functions of the electronic device 3 in accordance with the embodiments described in the present disclosure.

Figure 5:
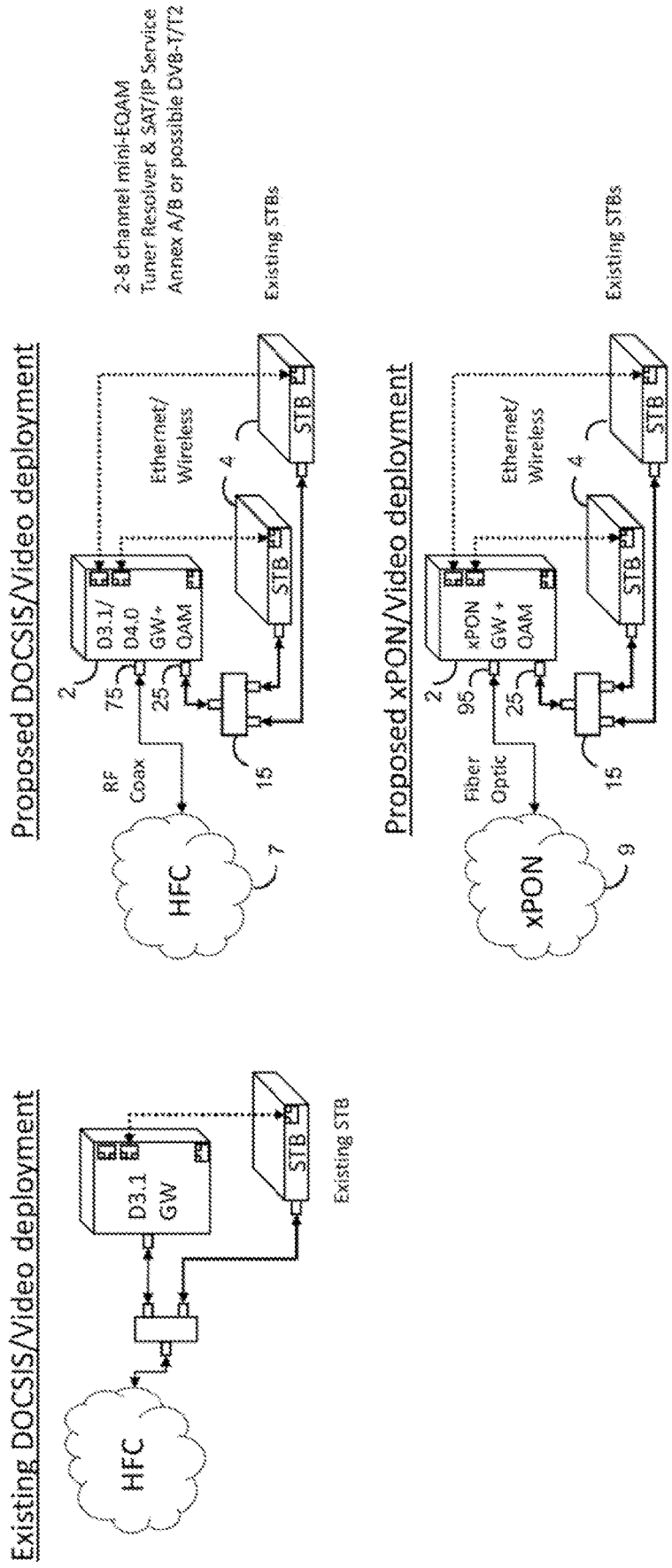
FIG. 5 is a diagram illustrating an existing DOCSIS/Video deployment in comparison to a proposed DOCSIS/Video deployment and a proposed xPON/Video deployment, according to some example embodiments of the present disclosure.

FIG. 5 is a diagram illustrating an existing DOCSIS/Video deployment in comparison to a proposed DOCSIS/Video deployment and a proposed xPON/Video deployment, according to some example embodiments of the present disclosure.

A residential or home gateway device 2 according to aspects of the present disclosure is equipped with a new D4.0 modem to perform an EQAM function (e.g., MiniEQAM function 250 described above with reference to FIGS. 1 and 3), which can be exploited to include a QAM modulator block. The EQAM function includes a combination of multiplexing+modulation+RF output. The gateway device 2 has enough processing power and memory (CPU/RAM) to support the EQAM function.

Some additional (external, auxiliary, etc.) hardware may also be provided with the gateway device 2 according to aspects of the present disclosure, in order to enable the QAM/RF output piece of the EQAM function to be performed by the gateway device 2. The proposed solutions involve developing mini EQAM functionality to embed into a DOCSIS gateway device, with the addition of a basic QAM modulator for one or more (e.g., 2-8×) channels integrated into a D4.0 chipset of the gateway device 2, and program signals being transmitted out via a new in-home RF f-connector 25 of the gateway device 2. Thus, each DOCSIS 3.1/4.0 gateway device 2 will have two RF connectors (75 for HFC network, and 25 for a new in-home QAM/RF network). On the other hand, however, each xPON gateway device 2 will have an optical fiber link 95 for xPON and an in-home RF f-connector 25 for the in-home QAM/RF network. For example, this new in-home RF f-connector may be implemented via partnership with a suitable manufacturer for DOCSIS and PON chipsets, or the like.

In the existing deployments, the DOCSIS 3.1 gateway devices only have a single RF f-connector to connect with the HFC network, as shown on the left side of FIG. 5. In the proposed deployments, however, a new in-home RF f-connector 25 may be provided with the gateway device 2, which enables the QAM/RF output part of the EQAM function to multiple existing STBs 4, as shown on the right side of FIG. 5. These improved gateway devices 2 of the proposed deployments offer DOCSIS 4.0 FDD/FDX service. In contrast to existing deployments, the proposed deployments do not require an RF overlay (e.g., in the case of xPON).

Figure 6:
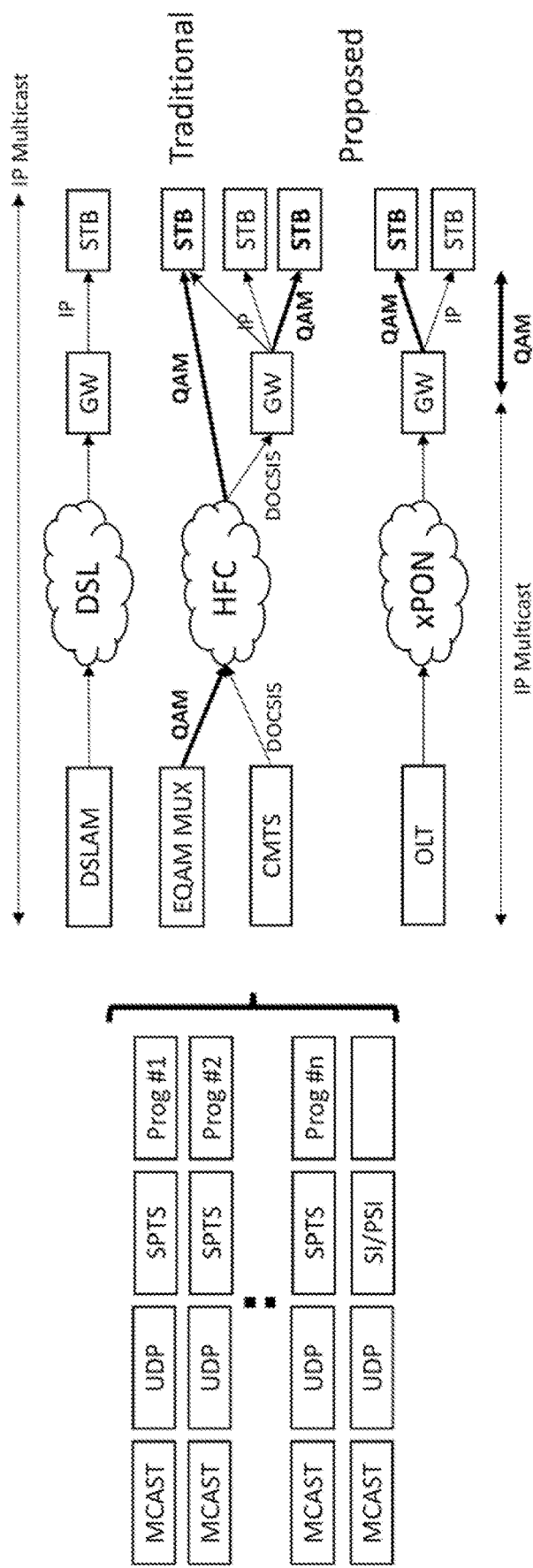
FIG. 6 is a diagram illustrating various example implementations for enabling STB QAM tuning to gateway RF channels in the home, according to some example embodiments of the present disclosure.

FIG. 6 is a diagram illustrating various example implementations for enabling STB QAM tuning to gateway RF channels in the home, according to some example embodiments of the present disclosure.

FIG. 6 includes a comparison between traditional models for DSL networks and DOCSIS HFC networks, and proposed models for DOCSIS HFC networks and xPON. In contrast to the traditional models, the gateway device 2 of the proposed models is equipped with the MiniEQAM function 250 and the new RF f-connector 25 for the in-home QAM/RF network.

An example implementation of the proposed solution, which allows the existing MPEG/QAM service layer to be removed from the HFC spectrum, will now be described. A new DOCSIS 3.1/4.0 gateway device 2 (or xPON gateway device 2) is configured with a basic "Edge" QAM block (e.g., MiniEQAM function 250) comprising three phases: (1) MPEP/IP program stream acquisition, (2) PSI/SI processing of broadcast related system information, and (3) multiplexing and/or modulation of multiple MPEG/IP program streams to (potentially) multiple MPEG/QAM channels.

In the MPEG/IP program stream acquisition phase, the MPEG/IP program streams are delivered to the gateway device 2 using IP multicast (or possibly unicast) over the broadband network (e.g., DOCSIS HFC 7, or xPON 9), based on interactions from a local legacy STB 4 during its "tuner resolve" phase of tuning to a new TV/audio program. In some other example embodiments, however, STB interaction is not required in the case of an "always-on" mode or channel line-up, which will be discussed further below.

In the multiplexing phase, the gateway device 2 multiplexes the requested MPEG single-program transport streams (SPTSs) into one or more final multi-program transport streams (MPTS(s)) that is/are delivered to a local embedded QAM modulator in the gateway device 2 that is capable of modulating and upconverting multiple QAM/RF channels over the local RF f-connector 25. The in-home STBs 4 are connected to the gateway device 2 using the new RF f-connector 25 specifically for the in-home QAM/RF network (which is completely separate from the HFC network or xPON).

In the case of receiving MPEG multi-program transport streams (MPTSs), the gateway device 2 may not need to perform multiplexing. Instead, multiple SPTSs may have already been multiplexed into a MPTS at another device located elsewhere in the broadband network. Referring to FIG. 6, there may be an EQAM multiplexer somewhere in the backend of the HFC network. For example, the gateway device 2 may subscribe to a particular MPTS that already includes multiple desired programs. In this case, the gateway device 2 simply provides the received MPTS to its embedded QAM modulator (EQAM 250) without performing multiplexing.

In some example embodiments, the gateway device 2 can deliver all programs on a preferred frequency (a specific QAM channel) requested by the STB 4. For example, the preferred frequency may be the frequency or QAM channel to which the STB 4 is currently tuned at the time of receiving the channel change instruction. In this manner, the STB 4 does not need to retune in response to channel changes, and instead the gateway device 2 adds the requested program to the preferred frequency (the specific QAM channel) "on-demand." This is particularly useful when the legacy MPEG/QAM STB only has a single tuner instead of multiple tuners. Since the STB 4 can receive multiple programs on the same frequency according to the proposed solution, the STB 4 does not need a second tuner (e.g., the single tuner can function as a "virtual tuner" via the modification of the middleware of the tuner resolve client of the STB 4 and the communication with the tuner resolve service of the gateway device 2.

Additional details of the flow of communications between the gateway device 2 and the STB 4 in FIG. 6 according to some example embodiments will be described below with reference to FIGS. 8-9.

Further, although not illustrated in FIG. 6, the proposed solution described above with reference to FIGS. 2 and 4 with respect to the standalone electronic device 3 has similar advantages over the traditional solutions shown in FIG. 6. In this case, the standalone electronic device 3 would be placed between the GW and the STB in the chart of FIG. 6 to perform the QAM modulation function (instead of an existing legacy GW for the HFC or xPON).

Figure 7:
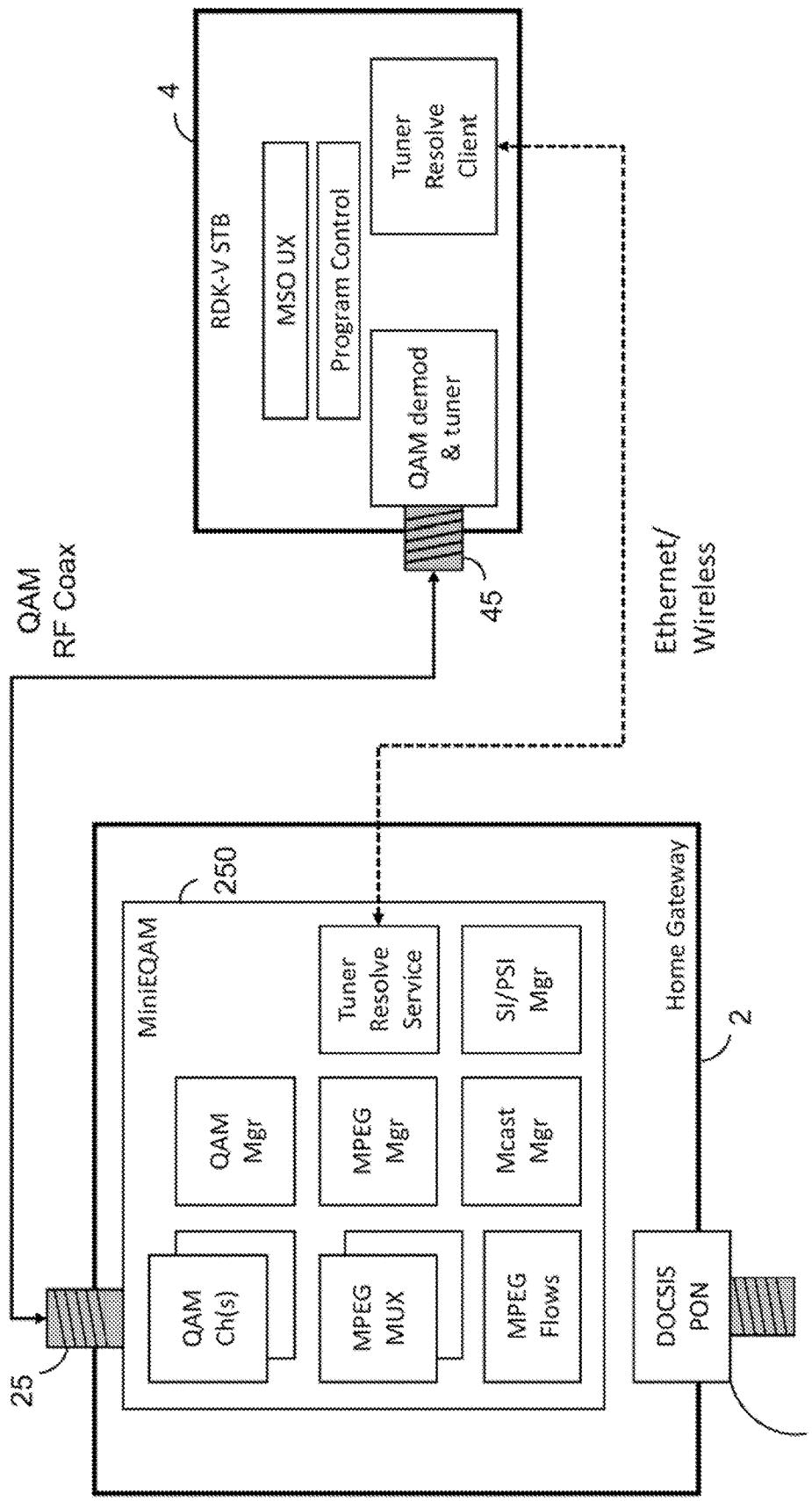
FIG. 7 is a diagram illustrating a high level architecture between the gateway device and the STB, according to an example embodiment of the present disclosure.

FIG. 7 is a diagram illustrating a high level architecture between the gateway device 2 and the STB 4, according to an example embodiment of the present disclosure.

As shown in FIG. 7, the gateway device 2 includes a new Mini "Edge" QAM (MiniEQAM) Function 250. The MiniEQAM function 250 of the gateway device 2 includes various components, including a tuner resolve service, SI/PSI manager, QAM manager, MPEG manager, multicast manager, QAM channel(s), MPEG multiplexer, and MPEG flows. These components of the MiniEQAM function 250 of the gateway device 2 may be implemented by the controller (processor) 26 executing the software (250) and/or reading the data (240) stored in the memory 24 of the gateway device 2, as described above with reference to FIGS. 1 and 3, for example.

As also shown in FIG. 7, the STB 4 includes a multiple services operator (MSO) user experience (UX), program control, a tuner resolve client, and a QAM demodulator and tuner. These components of the STB 4 may be implemented by a controller (processor) executing software and/or reading data stored in a memory of the STB 4.

The proposed solution may also involve modification of STB middleware tuning resolver (tuner resolve client) of the STB 4 to interact with the tuner resolve service of the gateway device 2, such that a STB program tune request results in the gateway device 2 presenting the required program over an available QAM/RF frequency, and notifying STB where to tune to (and/or what program # to look for). The modified middleware of the STB 4 may be based on Reference Design Kit for Video (RDK-V). With the proposed solution, the QAM channels are local between the gateway device 2 and the STB 4, instead of end-to-end between the HFC (or the xPON) and the STB like in the traditional model, and the gateway device 2 can multicast a single signal with multiple individual programs.

The tuner resolve client of the STB 4 may communicate with the tuner resolve service of the MiniEQAM 250 of the gateway device 2 via a wired Ethernet connection or a wireless LAN connection, for example. The STB 4 and the gateway device 2 can communicate to implement a procedure for STB QAM tuning to gateway RF channels in the home, according to aspects of the present disclosure. For example, the STB may receive a channel change instruction from a user, and request the gateway device 2 to deliver the new program on a preferred frequency (a preferred QAM channel). In some other example embodiments, an "always-on" mode may be provided with a defined set of channels, such that STB interaction is not required to deliver QAM channels to the STB 4.

The gateway device 2, via the MiniEQAM function 250, can look up what multicast stream on which the requested program is available (determine what MPEG flows go with what QAM channels), join that multicast stream (e.g., with MPEG/IP multicast being delivered to the gateway device 2 over DOCSIS or PON), identify each individual MPEG flow in the multicast stream, resolve PID values and determine how to multiplex MPEG flows to the STB. Then the tuner resolve service of the MiniEQAM 250 of the gateway device 2 can send a notification to the STB 4, via the wired Ethernet or the wireless LAN connection, indicating what frequency (which QAM channel) the STB 4 should tune to, and what program number to look for.

The tuner resolve client of the STB 4 can then control the QAM demodulator and tuner according to the frequency (QAM channel) received from the gateway device 2. This procedure may be considered a form of IP-directed QAM tuning in the home.

Further, although not illustrated in FIG. 7, the proposed solution described above with reference to FIGS. 2 and 4 with respect to the standalone electronic device 3 has similar configuration as the home gateway device 2 in FIG. 7. However, in this case the standalone electronic device 3 does not have the RF f-connector 75 of the DOCSIS gateway device 2 or the fiber optic link 95 of the xPON gateway device 2 for interfacing directly with the broadband network (HFC 7 or xPON 9). Instead, the standalone electronic device 3 has the wired/wireless LAN interface 31 for interfacing with the DOCSIS gateway device 6 or the xPON ONT 11 using an IP connection, such as Ethernet or Wifi, and these devices then have an RF f-connector 65 or an fiber optic link 115 to connect with the HFC 7 or xPON 9, respectively. In this case, the standalone electronic device 3 would include the MiniEQAM 350 and the RF f-connector 35 for the in-home QAM/RF network to implement the QAM modulation function (e.g., instead of the DOCSIS gateway device 6 or the xPON ONT 11, which may be unmodified legacy devices).

Figure 8:
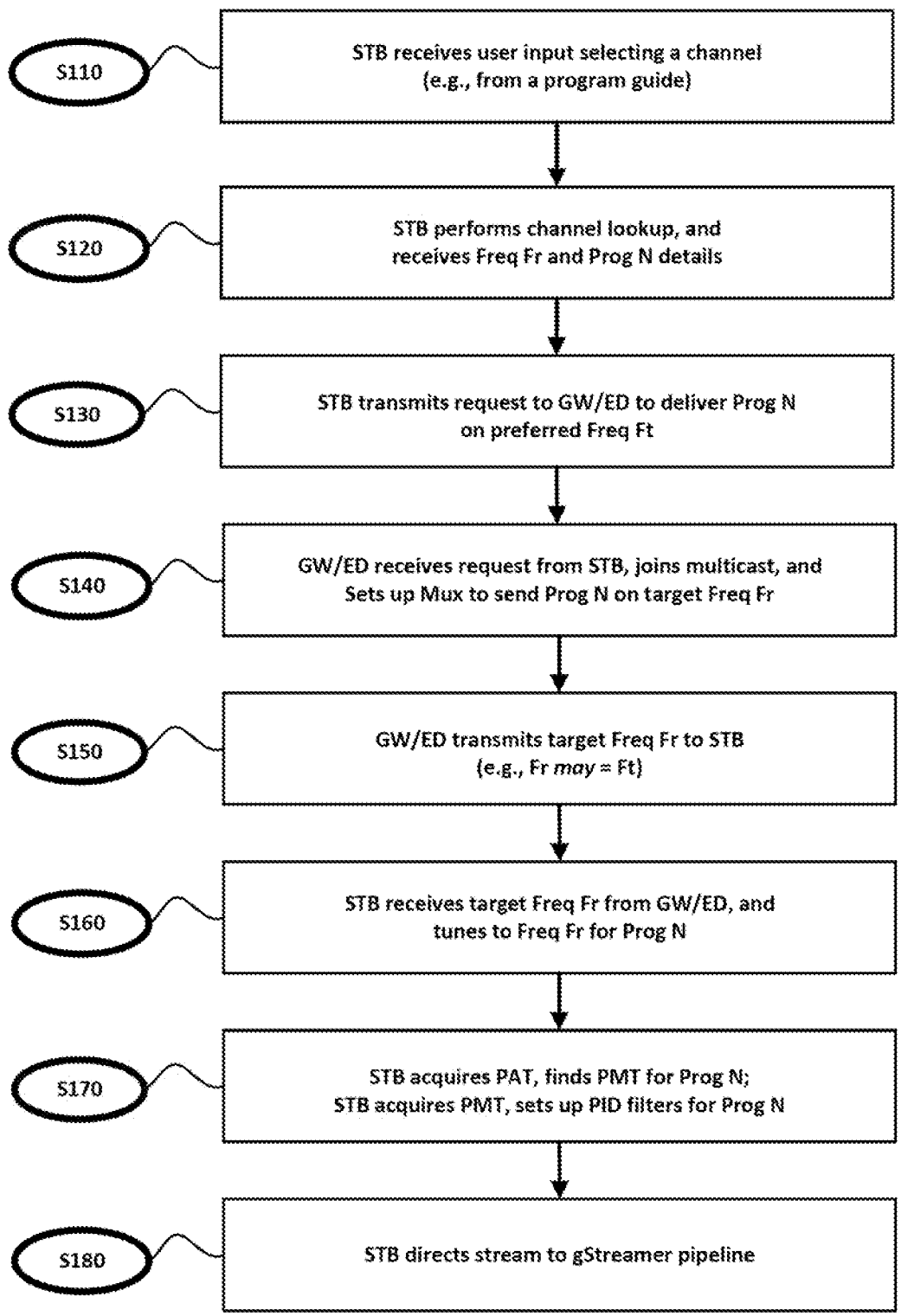
FIG. 8 is a flow chart illustrating a method for delivering content to legacy MPEG/QAM set-top boxes (STBs), according to an example embodiment of the present disclosure.

FIG. 8 is a flow chart of a method for delivering content to legacy MPEG/QAM set-top boxes (STBs), according to an example embodiment of the present disclosure.

A process for STB QAM tuning to gateway RF channels in the home will now be described with reference to FIG. 8. The method begins when the STB 4 receives user input selecting a channel (e.g., from a program guide), at step S110. At step S120, the STB performs a channel lookup, and receives Freq Fr and Prog N details. Steps S110-S120 of the proposed model are performed in a similar manner as in the traditional model currently used.

However, unlike the traditional model, the proposed model according to aspects of the present disclosure involves modifying the legacy MPEG/QAM STB to use the gateway tuner resolution service, as discussed above. According to example embodiments of the present disclosure, the STB 4 transmits a request to the gateway device 2 to deliver Prog N to the STB 4 on a preferred Freq Ft (e.g., a QAM channel to which the STB 4 is currently tuned, a specific QAM channel indicated by the STB 4, etc.), at step S130.

Then, at step S140, the gateway device 2 receives the request from the STB 4, joins multicast (e.g., an appropriate MPEG/IP multicast that includes the requested program), and sets up a multiplexer and/or a QAM modulator to send Prog N on a target Freq Fr. For example, in response to receiving the request, the gateway device 2 identifies a QAM channel (from its band of modulator channels) that has sufficient spare capacity to transmit the requested MPEG/

QAM program stream, and identifies a unique MPEG program number for the requested MPEG/QAM program stream.

According to the proposed model described above, the gateway device 2 requests the appropriate IP Multicast (based on a PROG X< >Multicast DB lookup) from the broadband network (e.g., HFC 7 or xPON 9). Once the gateway device 2 receives any packets (in MPEG2-TS/UDP) from the broadband network, the gateway device 2 performs its MPEG multiplexing function (in the case of "SPTS mode"), taking these packets and combining them with potentially other MPEG programs on the same QAM/RF channel (and other PSI/SI data), before sending the final formatted Multi Program Transport Stream (MPTS) to its local QAM modulator/upconverter to be sent to the locally connected STB(s) 4. In the case of "MPTS mode," however, the gateway device 2 may not perform multiplexing and sends the original MPTS received from the broadband network to the local QAM modulator/upconverter to be sent to the STB(s) 4. In some example embodiments, each MPTS may include multiple SPTSs (e.g., 8-20 SPTSs in a single MPTS) and fills a single QAM channel to ensure the most efficiency without loss of data.

At step S150, the gateway device 2 transmits the target Freq Fr to the STB 4. For example, the gateway device 2 notifies the STB 4 what frequency (QAM channel) to which the STB 4 is to be tuned, and what program number to look for.

In some example embodiments, the target Freq Fr that the gateway device 2 sends to the STB 4 is a same frequency (a same QAM channel) as the preferred Freq Ft requested by the STB 4. For example, the gateway device 2 can transmit the MPEG/QAM streams over the frequency or QAM channel to which the STB 4 is currently tuned. However, in some other example embodiments, the target Freq Fr that the gateway device 2 sends to the STB 4 is a different frequency (a different QAM channel) from the preferred Freq Ft requested by the STB 4. For example, the preferred Freq Ft (or preferred QAM channel) may have reached or be near its capacity (i.e., there is only so much capacity for video streams per QAM channel), in which case the gateway device 2 would need to use a different frequency (or a different QAM channel) that has enough available capacity to add the new program requested by the STB 4. In some instances, the result may depend on whether the STB 4 is an older set-top box with only a single tuner, or whether there are other set-top boxes already on the same frequency or QAM channel as requested by the STB 4, for example.

At step S160, the STB 4 receives the target Freq Fr from the gateway device 2, and tunes to Freq Fr for Prog N. As mentioned above, the target Freq Fr may be the same frequency (or QAM channel) as the preferred Freq Ft in some example embodiments. However, in some other example embodiments, the gateway device 2 may need to use a different frequency (or different QAM channel), such as when there is insufficient capacity available on the preferred Freq Fr to add the new program requested by the STB 4.

Then, at step S170, the STB 4 acquires PAT, and finds PMT for Prog N. In addition, the STB 4 acquires PMT, and sets up PID filters for Prog N. Finally, the STB directs the stream to gStreamer pipeline, at step S180. Steps S170-S180 of the proposed model are performed in a similar manner as in the traditional model currently used.

Figure 9:
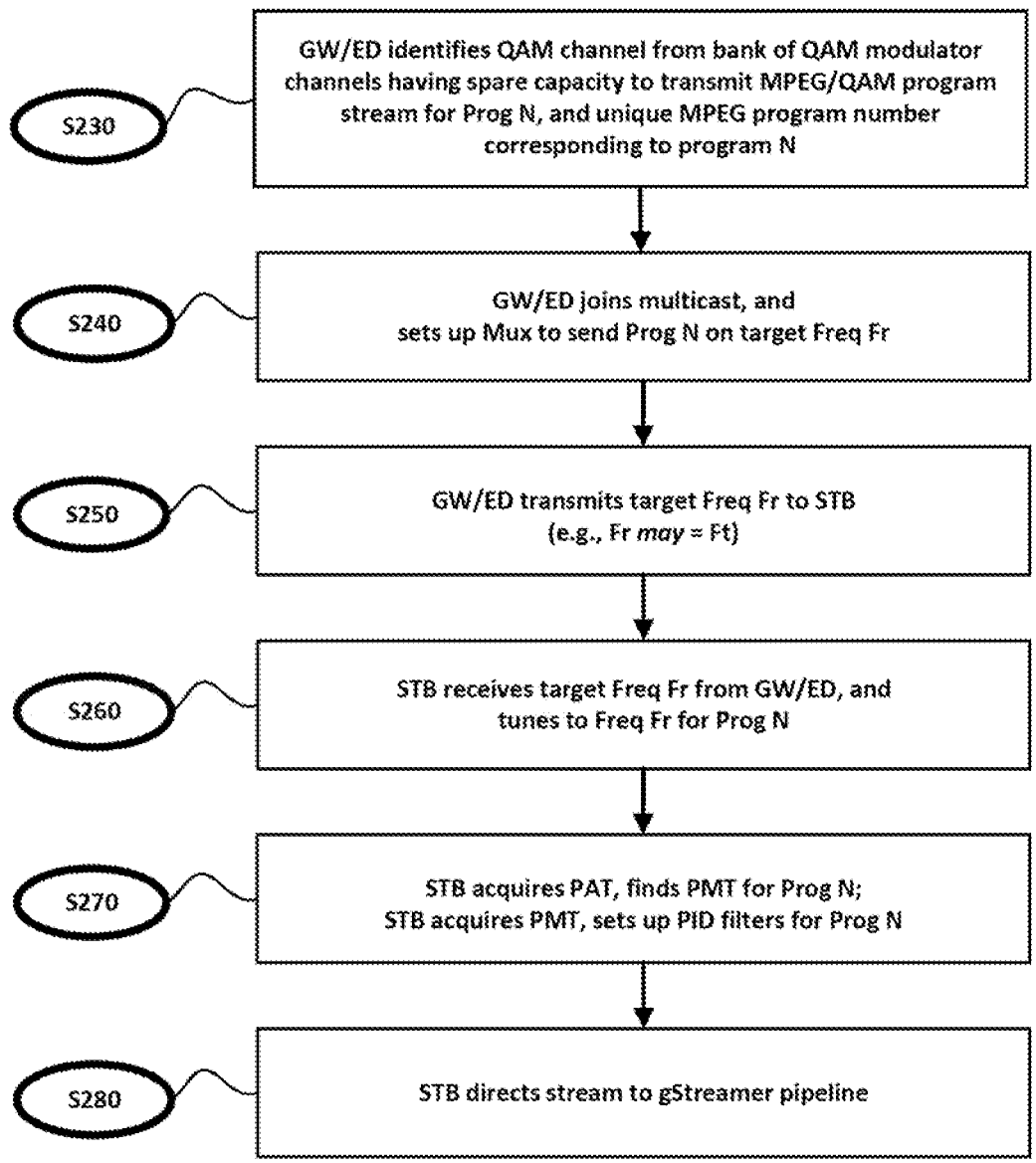
FIG. 9 is a flow chart illustrating a method for delivering content to legacy MPEG/QAM set-top boxes (STBs), according to an example embodiment of the present disclosure.

FIG. 9 is a flow chart illustrating a method for delivering content to legacy MPEG/QAM set-top boxes (STBs), according to an example embodiment of the present disclosure.

As mentioned above, the gateway device 2 or the electronic device 3 may be able to operate in an "always-on" mode, which may be configured either via a local user interface or a remote interface to send a specific channel line-up, thus not requiring any interaction from the STB 4 (e.g., a channel change request from the STB 4 is not required for the gateway device 2 or the electronic device 3 to transmit the MPEG/QAM channels to the STB 4). In other words, the gateway device 2 or the electronic device 3 can always deliver a certain set of channels (e.g., which may be set manually and/or determined automatically based on various user presets, user preferences, popularity, relevance, historical usage, or combinations thereof) to the STB 4. In addition, the gateway device 2 or electronic device 3 can transmit a message or notification to the STB 4 to update the STB 4 and/or notify the subscriber of any changes to the channel line-up (e.g., additions to or removals from set of "always-on" channels).

According to example embodiments of the present disclosure, the gateway device 2 or the electronic device 3 identifies a QAM channel from a bank of QAM modulator channels having spare capacity to transmit an MPEG/QAM program stream for Program N, and a unique MPEG program number corresponding to the Program N, at step S230.

Then, at step S240, the gateway device 2 or the electronic device 3 joins multicast (e.g., an appropriate MPEG/IP multicast that includes the desired "always-on" program(s)), and sets up a multiplexer (in the case of receiving SPTSs from the IP multicast over the broadband network) and/or a QAM modulator to send Prog N on a target Freq Fr.

According to the proposed model described above, the gateway device 2 requests the appropriate IP Multicast (based on a PROG X< >Multicast DB lookup) from the broadband network (e.g., HFC 7 or xPON 9). Once the gateway device 2 receives any packets (in MPEG2-TS/UDP) from the broadband network, the gateway device 2 performs its MPEG multiplexing function (in the case of "SPTS mode"), taking these packets and combining them with potentially other MPEG programs on the same QAM/RF channel (and other PSI/SI data), before sending the final formatted Multi Program Transport Stream (MPTS) to its local QAM modulator/upconverter to be sent to the locally connected STB(s) 4. In the case of "MPTS mode," the gateway device 2 or the electronic device 3 may not perform multiplexing, and may simply send the original MPTS received from the IP multicast over the broadband network to its QAM modulator/upconverter to be sent to the STBs 4. In some example embodiments, each MPTS may include multiple SPTSs (e.g., 8-20 SPTSs in a single MPTS) and fills a single QAM channel to ensure the most efficiency without loss of data.

At step S250, the gateway device 2 transmits the target Freq Fr to the STB 4. For example, the gateway device 2 notifies the STB 4 what frequency (QAM channel) to which the STB 4 is to be tuned, and what program number to look for.

At step S260, the STB 4 receives the target Freq Fr from the gateway device 2, and tunes to Freq Fr for Prog N. Then, at step S270, the STB 4 acquires PAT, and finds PMT for Prog N. In addition, the STB 4 acquires PMT, and sets up PID filters for Prog N. Finally, the STB directs the stream to gStreamer pipeline, at step S280. Steps S270-S280 of the proposed model are performed in a similar manner as in the traditional model currently used.

Thus, the gateway device 2 (and/or the standalone electronic device 3) according to aspects of the present disclosure enables operators to maintain existing MPEG/QAM legacy STB implementations well into the future, enables the deployment of D4.0 FDD/FDX operation by removing MPEG/QAM (e.g., from the HFC network to an in-home QAM/RF network), frees up HFC spectrum for reuse in broadband delivery, and avoids the need for RF overlay for xPONs. The proposed solution enables delivery of pre-encrypted broadcast services using multicast of MPEG2-TS/SPTS over UDP/IP over DOCSIS or xPON. The D3.1/D4.0 gateway device according to aspects of the present disclosure receives requested SPTS streams (or MPTS streams), multiplexes the SPTS streams into a final MPTS stream if appropriate (SPTS mode), and modulates the final MPTS stream (SPTS mode) or the original MPTS streams (MPTS mode) over an in-home QAM/RF network to legacy STBs 4, using one or more (e.g., 2-8) QAM channels to deliver multiple (e.g., 8, 12, 16) programs to the STBs 4.

Annex A/B/C operation (and/or possible DVB-T/T2 in home to Smart TVs, instead of a standalone STB) may be possible. The embedded EQAM functionality disclosed herein could be licensed or offered as value-added service to MSOs and be incorporated into RDK-B (as a binary only option). In addition, the proposed solution also potentially delays the need for, and co-exists with, an IPTV upgrade in the future.

Figure 10:
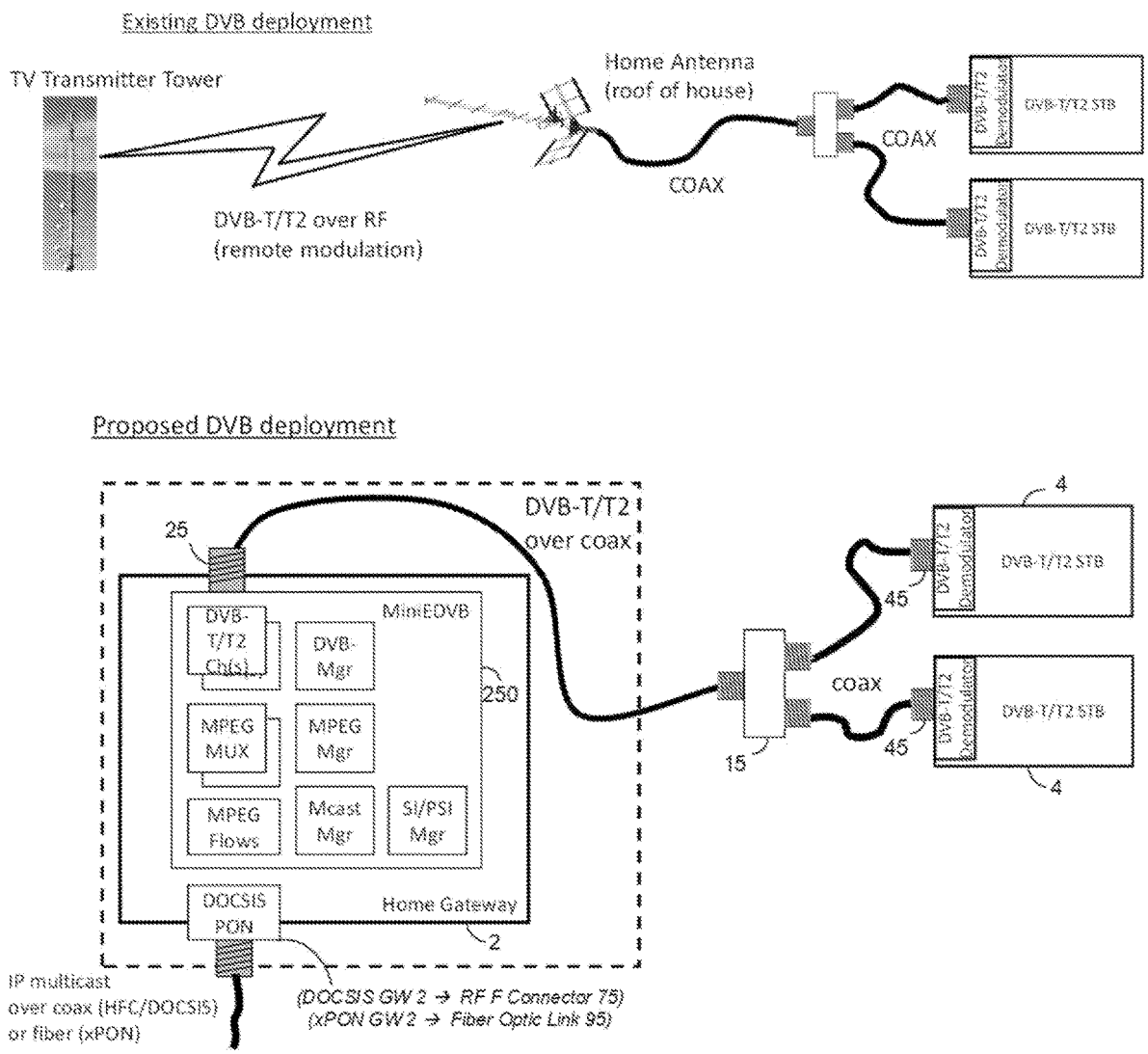
FIG. 10 is a diagram illustrating an existing DVB deployment in comparison to a proposed DVB deployment, including a high level architecture between the gateway device and the STBs according to some example embodiments of the present disclosure.

FIG. 10 is a diagram illustrating an existing DVB deployment in comparison to a proposed DVB deployment, including a high level architecture between the gateway device 2 and the STBs 4 according to some example embodiments of the present disclosure.

Although the above-described solution applies to an MPEG/QAM network typically found in cable operator networks, and it could apply to another type of network as well.

In Europe, terrestrial TV is transmitted using Digital Video Broadcasting (DVB), also referred to as DVB-T and DVB-T2, which are modulation systems that replaced the old analog TV transmission, offering Standard Definition (SD) and High Definition (HD) signals over the air to antennas mounted at subscribers' homes. The transmission gear for DVB consists of MPEG multiplexers and DVB-T/T2 transmitters, which are modulators and upconverters that operate the same as cable TV distribution works, just sending the signal over the air using an antenna to a large distributed network of STBs and/or Smart TVs that have built in tuners/demodulators.

As shown in FIG. 10, according to the existing DVB solution, a TV transmitter tower sends digital TV programs encoded in DVB-T/T2 signals over the air to a home antenna (e.g., mounted on the roof or exterior of the subscriber's home) that is connected to one or more DVB-T/T2 STBs using coaxial cable (and a splitter in the case of multiple STBs). The DVB-T/T2 principal of getting MPEG programs via IP multicast in SPTS mode (or MPTS mode), multiplexing the SPTSs together in SPTS mode, and modulating the final MPTS in SPTS mode (or modulating the original MPTS in MPTS mode) and sending the MPEG/DVB channels to STBs 4 or Smart TVs is roughly the same as for MPEG/QAM channels in cable networks. The primary difference in the case of the existing DVB solution is that a wireless RF signal is transmitted by large powerful antennas to geographic areas, and the home antenna receives the signal and connects to the STB (or Smart TV) using a coaxial cable.

Accordingly, the QAM modulation solution (Mini Edge QAM 250, 350) described above can be applied similarly in the alternative case of DVB-T/T2 OFDMA modulation (Mini Edge DVB 250, 350). In the proposed DVB solution, however, there would be no need for a home antenna like with the existing DVB solution described above and shown at the top of FIG. 10. Instead, the MPEG signals would be received by the gateway device 2 or the electronic device 3 over the broadband network (e.g., DOCSIS HFC network 7 and/or xPON 9, as described above), and sent by the gateway device 2 or the electronic device 3 via coaxial cable to the DVB-T/T2 STB 4 (or SmartTV), like with the proposed solution for the case of QAM described above.

Similarly, the gateway device 2 or the electronic device 3 can receive the MPEG programs via IP multicast (like described above), in either single program transport stream (SPTS) mode or multiple program transport stream (MPTS) mode. In the event that the MPEG programs are delivered using "SPTS mode" (e.g., wherein each SPTS signal carries content of a single TV program), then the gateway device 2 or electronic device 3 will include a multiplexer to combine the original STPS signals together to form a final MPTS (an aggregate of the multiple original STPS signals). For example, the gateway device 2 or the electronic device 3 could subscribe to a first IP multicast stream containing one or more first SPTS(s) and a second IP multicast stream containing one or more second SPTS(s) (e.g., where each SPTS corresponds to a single television network or channel).

However, in the event that the MPEG programs are delivered to the gateway device 2 or the electronic device 3 using "MPTS mode" (e.g., where multiple STPSs have already been multiplexed by another device such as an EDVB MUX somewhere in the broadband network prior to being delivered to the gateway device 2 or the electronic device 3, and each MPTS signal carries content of multiple TV programs), then the gateway device 2 or the electronic device 3 may not need to perform multiplexing of the original MPTS prior to modulation and delivery to the STB 4. For example, the gateway device 2 or the electronic device 3 could actually subscribe to an IP multicast stream containing a certain MPTS (e.g., corresponding to a particular combination of television networks or channels), and by doing so, will not have to perform the multiplexing function itself, and instead could pass the original MPTS signal directly over to the DVB-T/T2 modulator (Mini Edge DVB 250 or 350) of the gateway device 2 or the electronic device 3.

In either case, the original MPTS (in MPTS mode) or the final MPTS (in SPTS mode) received at the gateway device 2 or the electronic device 3 over the broadband network via IP multicast will be sent to the DVB-T/T2 modulator (Mini Edge DVB 250 or 350) of the gateway device 2 or electronic device 3 for DVB modulation, and transmitted out via an RF f-connector 25 or 35 for an in-home DVB/RF network of the gateway device 2 or electronic device 3 to a coaxial cable connecting to the STB 4 (or Smart TV).

The proposed solution offers a different way to send the same digital TV programs as the existing DVB solution by encoding them in a DVB-T/T2 signal using a DVB-T/T2 modulator included in the gateway device 2 or the electronic device 3 that it sends directly to the DVB-T/T2 STB 4 using the RF f-connector 25 or 35 and coaxial cable, without requiring an aerial antenna to be mounted at the subscriber's home. Instead of receiving the DVB-T/T2 signals from the TV transmitter tower, the gateway device 2 or the electronic device 3 sources the digital TV programs from the broadband network (e.g., DOCSIS HFC network 7 or xPON 9, as in the example embodiments described above) via IP multicast, and forwards the digital TV programs to the STB 4 using DVB-T/T2 modulation transmitted over its RF f-connector 25 or 35 that is directly connected to the STB 4 via the coaxial cable.

In this alternative example embodiment, the gateway device 2 or the electronic device 3 would operate in an "always-on" mode, which may be configured either via a local user interface or a remote interface to send a specific channel line-up, thus not requiring any interaction from the STB 4 (e.g., a channel change request from the STB 4 is not required for the gateway device 2 or the electronic device 3 to transmit the MPEG/DVB channels to the STB 4). In other words, the gateway device 2 or the electronic device 3 can always deliver a certain set of channels (e.g., which may be set manually and/or determined automatically based on various user presets, user preferences, popularity, relevance, historical usage, or combinations thereof) to the STB 4. In addition, the gateway device 2 or electronic device 3 can transmit a message or notification to the STB 4 to update the STB 4 and/or notify the subscriber of any changes to the channel line-up (e.g., additions to or removals from set of "always-on" channels) via the coaxial connection.

In the United States, Advanced Television Systems Committee (ATSC) standards are used for digital TV "over the air" (OTA) broadcasts. Therefore, the same proposed solution described above for Europe can apply similarly in the US by including an ATSC capable modulator (Mini Edge ATSC 250 or 350) in place of a DVB-T/T2 modulator in the gateway device 2 or electronic device 3.

Further, although not illustrated in FIG. 10, the proposed solution described above with reference to FIGS. 2 and 4 with respect to the standalone electronic device 3 has similar configuration as the home gateway device 2 in FIG. 10. However, the standalone electronic device 3 does not have the RF f-connector 75 of the DOCSIS gateway device 2 or the fiber optic link 95 of the xPON gateway device 2 for interfacing directly with the broadband network (HFC 7 or xPON 9). Instead, the standalone electronic device 3 has the wired/wireless LAN interface 31 for interfacing with the DOCSIS gateway device 6 or the xPON ONT 11 using an IP connection, such as Ethernet or Wifi, and these devices then have the RF f-connector 65 or fiber optic link 115 to connect with the HFC 7 or xPON 9. In this case, the standalone electronic device 3 would include the MiniEDVB 350 and the RF f-connector 35 for the in-home DVB/RF network to implement the DVB modulation function (e.g., instead of the DOCSIS gateway device 6 or the xPON ONT 11). This also applies similarly when using the ATSC modulator in the US, instead of the DVB modulator in Europe, in the standalone electronic device 3.

The gateway device 2 and/or the standalone electronic device 3 may be programmed with instructions (e.g., controller instructions) to execute the MiniEQAM function 250/350 (and/or the MiniEDVB function 250/350, and/or the MiniEATSC function 250/350) in some example embodiments, or may use its native software in some other example embodiments. It is assumed that the devices include their respective controllers or processors and their respective software stored in their respective memories, as discussed above, which when executed by their respective controllers or processors perform the functions and operations for enabling STB QAM tuning to gateway RF channels in the home, and for enabling DOCSIS 4.0 FDD/FDX operation in HFC plants, in accordance with the example embodiments of the present disclosure.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. An electronic device for delivering content to legacy MPEG quadrature amplitude modulation (QAM) set-top boxes (STBs), the electronic device comprising:
   a memory storing instructions; and
   a processor configured to execute the instructions to:
      identify a QAM channel from a bank of QAM modulator channels of the electronic device that has spare capacity to transmit a MPEG/QAM program stream for a program N, and a unique MPEG program number corresponding to the program N;
      join an IP multicast from a broadband network that includes the program N, and set up QAM modulation to send the program N on a target frequency corresponding to the identified QAM channel;
      transmit the target frequency to the STBs, wherein transmitting the target frequency notifies the STBs of the target frequency to which the STB is to be tuned and the program N to look for; and
      transmit the MPEG/QAM program stream for the program N to the STBs on the target frequency corresponding to the identified QAM channel.

2. The electronic device of claim 1, wherein the processor is further configured to execute the instructions to:
   receive a request from one of the STBs to deliver the MPEG/QAM program stream for the program N on a preferred frequency,
   wherein the target frequency sent by the electronic device corresponds to a same QAM channel as the preferred frequency requested by the one of the STBs in a condition that the preferred frequency has enough spare capacity to transmit the MPEG/QAM program stream.

3. The electronic device of claim 1, wherein the processor is further configured to execute the instructions to:
   receive a request from one of the STBs to deliver the MPEG/QAM program stream for the program N on a preferred frequency,
   wherein the target frequency sent by the electronic device corresponds to an available QAM channel that is different from the preferred frequency requested by the one of the STBs in a condition that the preferred frequency does not have enough spare capacity to transmit the MPEG/QAM program stream.

4. The electronic device of claim 1, wherein the electronic device is remotely controlled or configured locally to:
   deliver a defined set of "always on" channels to the STBs over an RF f-connector for an in-home QAM/RF network, without requiring a request from the STBs; and
   transmit an update for the defined set of "always on" channels to the STBs via a wired/wireless local area network (LAN) interface in response to a change in an MPEG/QAM channel lineup.

5. The electronic device of claim 1, wherein the electronic device is a DOCSIS gateway device, the broadband network is an HFC network, and the electronic device further comprises:
   a first RF f-connector for the HFC network, wherein the electronic device communicates with a cable modem termination system (CMTS) over the HFC network via the first RF f-connector to receive MPEG/IP single program transport streams (SPTSs) or a multi program transport stream (MPTS) from the IP multicast;
   a multiplexer configured to multiplex the received MPEG/IP STPSs into a final MPTS directed to one or more QAM channels;
   a QAM modulator configured to modulate and upconvert the received MPTS or the final MPTS on the one or more QAM channels; and
   a second RF f-connector for an in-home QAM/RF network, wherein electronic device is configured to transmit the one or more QAM channels output from the QAM modulator to the STBs over the in-home QAM/RF network via the second RF f-connector.

6. The electronic device of claim 1, wherein the electronic device is an xPON gateway device, and the broadband network is an xPON, and the electronic device further comprises:
   a fiber optic link for the xPON, wherein the electronic device communicates with an optical line terminal (OLT) over the xPON via the fiber optic link to receive MPEG/IP single program transport streams (SPTSs) or multi program transport streams (MPTSs) from the IP multicast;
   a multiplexer configured to multiplex the received MPEG/IP STPSs into a final MPTS directed to one or more QAM channels;
   a QAM modulator configured to modulate and upconvert the received MPTS or the final MPTS on the one or more QAM channels; and
   an RF f-connector for an in-home QAM/RF network, wherein the electronic device is configured to transmit the one or more QAM channels output from the QAM modulator to the STBs over the in-home QAM/RF network via the RF f-connector.

7. The electronic device of claim 1, wherein the electronic device is a standalone (non-DOCSIS) electronic device, the broadband network is an HFC network, and the electronic device further comprises:
   a wired/wireless local area network (LAN) interface including one or more Ethernet ports, one or more Wi-Fi radios, or combinations thereof, wherein the electronic device communicates with a DOCSIS gateway device, which communicates with a cable modem termination system (CMTS) via the HFC network, over the LAN via the wired/wireless LAN interface to receive MPEG/IP single program transport streams (SPTSs) or a multi-program transport stream (MPTS) from the IP multicast;
   a multiplexer configured to multiplex the received MPEG/IP SPTSs into a final MPTS directed to one or more QAM channels;

a QAM modulator configured to modulate and upconvert the received MPTS or the final MPTS on the one or more QAM channels; and an RF f-connector for an in-home QAM/RF network, wherein the electronic device is configured to transmit the one or more QAM channels output from the QAM modulator to the STBs over the in-home QAM/RF network via the RF f-connector.

8. The electronic device of claim 1, wherein the electronic device is a standalone (non-xPON) electronic device, and the broadband communication network is an xPON, and the electronic device further comprises:

a wired/wireless local area network (LAN) interface including one or more Ethernet ports, one or more Wi-Fi radios, or combinations thereof, wherein the electronic device communicates with an optical network terminal (ONT), which communicates with an optical line terminal (OLT) via the xPON, over the LAN via the wired/wireless LAN interface to receive MPEG/IP single program transport streams (SPTSs) or a multi program transport stream (MPTS) from the IP multicast;

a multiplexer configured to multiplex the received MPEG/IP SPTSs into a final MPTS directed to one or more QAM channels;

a QAM modulator configured to modulate and upconvert the received MPTS or the final MPTS on the one or more QAM channels; and an RF f-connector for an in-home QAM/RF network, wherein electronic device is configured to transmit the one or more QAM channels output from the QAM modulator to the STBs over the in-home QAM/RF network via the RF f-connector.

9. A method for delivering content to legacy MPEG/QAM set-top boxes (STBs) by an electronic device, the method comprising:

identifying a QAM channel from a bank of QAM modulator channels of the electronic device that has spare capacity to transmit a MPEG/QAM program stream for a program N, and a unique MPEG program number corresponding to the program N;

joining an IP multicast from a broadband network that includes the program N, and setting up QAM modulation to send the program N on a target frequency corresponding to the identified QAM channel;

transmitting the target frequency to the STBs, wherein transmitting the target frequency notifies the STBs of the target frequency to which the STB is to be tuned and the program N to look for; and transmitting the MPEG/QAM program stream for the program N to the STBs on the target frequency corresponding to the identified QAM channel.

10. The method of claim 9, further comprising:

receiving a request from one of the STBs to deliver the MPEG/QAM program stream for the program N on a preferred frequency, wherein the target frequency sent by the electronic device corresponds to a same QAM channel as the preferred frequency requested by the one of the STBs in a condition that the preferred frequency has enough spare capacity to transmit the MPEG/QAM program stream.

11. The method of claim 9, further comprising:

receiving a request from one of the STBs to deliver the MPEG/QAM program stream for the program N on a preferred frequency, wherein the target frequency sent by the electronic device corresponds to an available QAM channel that is different from the preferred frequency requested by the one of the STBs in a condition that the preferred frequency does not have enough spare capacity to transmit the MPEG/QAM program stream.

12. The method of claim 9, further comprising:

remotely controlling or locally configuring the electronic device to:

deliver a defined set of "always on" channels to the STBs over an RF f-connector for an in-home QAM/RF network, without requiring a request from the STBs; and transmit an update for the defined set of "always on" channels to the STBs via a wired/wireless local area network (LAN) interface in response to a change in an MPEG/QAM channel lineup.

13. The method of claim 9, wherein the electronic device is a DOCSIS gateway device, the broadband network is an HFC network, and the method further comprises:

communicating with a cable modem termination system (CMTS) over the HFC network via a first RF f-connector for the HFC network to receive MPEG/IP single program transport streams (SPTSs) or a multi program transport stream (MPTS) from the IP multicast;

multiplexing the received MPEG/IP STPSs into a final MPTS directed to one or more QAM channels;

modulating and upconverting the received MPTS or the final MPTS on the one or more QAM channels via a QAM modulator of the electronic device; and transmitting the one or more QAM channels output from the QAM modulator to the STBs over an in-home QAM/RF network via a second RF f-connector for the in-home QAM/RF network.

14. The method of claim 9, wherein the electronic device is an xPON gateway device, and the broadband network is an xPON, and the method further comprises:

communicating with an optical line terminal (OLT) over the xPON via a fiber optic link for the xPON to receive MPEG/IP single program transport streams (SPTSs) or multi program transport streams (MPTSs) from the IP multicast;

multiplexing the received MPEG/IP STPSs into a final MPTS directed to one or more QAM channels;

modulating and upconverting the received MPTS or the final MPTS on the one or more QAM channels via a QAM modulator of the electronic device; and transmitting the one or more QAM channels output from the QAM modulator to the STBs over an in-home QAM/RF network via an RF f-connector for the in-home QAM/RF network.

15. The method of claim 9, wherein the electronic device is a standalone (non-DOCSIS) electronic device, the broadband network is an HFC network, and the method further comprises:

communicating with a DOCSIS gateway device, which communicates with a cable modem termination system (CMTS) via the HFC network, over the LAN via a wired/wireless LAN interface including one or more Ethernet ports, one or more Wi-Fi radios, or combinations thereof, to receive MPEG/IP single program transport streams (SPTSs) or a multi-program transport stream (MPTS) from the IP multicast;

multiplexing the received MPEG/IP SPTSs into a final MPTS directed to one or more QAM channels;

modulating and upconverting the received MPTS or the final MPTS on the one or more QAM channels via a QAM modulator of the electronic device; and transmitting the one or more QAM channels output from the QAM modulator to the STBs over an in-home QAM/RF network via an RF f-connector for the in-home QAM/RF network.

16. The method of claim 9, wherein the electronic device is a standalone (non-xPON) electronic device, and the broadband communication network is an xPON, and the method further comprises:
  communicating with an optical network terminal (ONT), which communicates with an optical line terminal (OLT) via the xPON, over the LAN via a wired/wireless LAN interface including one or more Ethernet ports, one or more Wi-Fi radios, or combinations thereof, to receive MPEG/IP single program transport streams (SPTSs) or a multi program transport stream (MPTS) from the IP multicast;
  multiplexing the received MPEG/IP SPTSs into a final MPTS directed to one or more QAM channels;
  modulating and upconverting the received MPTS or the final MPTS on the one or more QAM channels; and
  transmitting the one or more QAM channels output from the QAM modulator to the STBs over an in-home QAM/RF network via an RF f-connector for the in-home QAM/RF network.

17. A non-transitory computer-readable medium storing instructions for delivering content to legacy MPEG/QAM set-top boxes (STBs), the instructions when executed by a processor of an electronic device causing the electronic device to perform operations comprising:
  identifying a QAM channel from a bank of QAM modulator channels of the electronic device that has spare capacity to transmit a MPEG/QAM program stream for a program N, and a unique MPEG program number corresponding to the program N;
  joining an IP multicast from a broadband network that includes the program N, and setting up QAM modulation to send the program N on a target frequency corresponding to the identified QAM channel;
  transmitting the target frequency to the STBs, wherein transmitting the target frequency notifies the STBs of the target frequency to which the STB is to be tuned and the program N to look for; and
  transmitting the MPEG/QAM program stream for the program N to the STBs on the target frequency corresponding to the identified QAM channel.

18. The non-transitory computer-readable medium of claim 17, wherein the instructions when executed by the processor cause the electronic device to perform operations further comprising:
  receiving a request from one of the STBs to deliver the MPEG/QAM program stream for the program N on a preferred frequency,
  wherein the target frequency sent by the electronic device corresponds to a same QAM channel as the preferred frequency requested by the one of the STBs in a condition that the preferred frequency has enough spare capacity to transmit the MPEG/QAM program stream.

19. The non-transitory computer-readable medium of claim 17, wherein the instructions when executed by the processor cause the electronic device to perform operations further comprising:
  receiving a request from one of the STBs to deliver the MPEG/QAM program stream for the program N on a preferred frequency,
  wherein the target frequency sent by the electronic device corresponds to an available QAM channel that is different from the preferred frequency requested by the one of the STBs in a condition that the preferred frequency does not have enough spare capacity to transmit the MPEG/QAM program stream.

20. The non-transitory computer-readable medium of claim 17, wherein the instructions when executed by the processor cause the electronic device to perform operations further comprising:
  remotely controlling or locally configuring the electronic device to:
  deliver a defined set of "always on" channels to the STBs over an RF f-connector for an in-home QAM/RF network, without requiring a request from the STBs; and
  transmit an update for the defined set of "always on" channels to the STBs via a wired/wireless local area network (LAN) interface in response to a change in an MPEG/QAM channel lineup.

21. The non-transitory computer-readable medium of claim 17, wherein the electronic device is a DOCSIS gateway device, the broadband network is an HFC network, and the instructions when executed by the processor cause the electronic device to perform operations further comprising:
  communicating with a cable modem termination system (CMTS) over the HFC network via a first RF f-connector for the HFC network to receive MPEG/IP single program transport streams (SPTSs) or a multi program transport stream (MPTS) from the IP multicast;
  multiplexing the received MPEG/IP STPSs into a final MPTS directed to one or more QAM channels;
  modulating and upconverting the received MPTS or the final MPTS on the one or more QAM channels via a QAM modulator of the electronic device; and
  transmitting the one or more QAM channels output from the QAM modulator to the STBs over an in-home QAM/RF network via a second RF f-connector for the in-home QAM/RF network.

22. The non-transitory computer-readable medium of claim 17, wherein the electronic device is an xPON gateway device, and the broadband network is an xPON, and the instructions when executed by the processor cause the electronic device to perform operations further comprising:
  communicating with an optical line terminal (OLT) over the xPON via a fiber optic link for the xPON to receive MPEG/IP single program transport streams (SPTSs) or multi program transport streams (MPTSs) from the IP multicast;
  multiplexing the received MPEG/IP STPSs into a final MPTS directed to one or more QAM channels;
  modulating and upconverting the received MPTS or the final MPTS on the one or more QAM channels via a QAM modulator of the electronic device; and
  transmitting the one or more QAM channels output from the QAM modulator to the STBs over an in-home QAM/RF network via an RF f-connector for the in-home QAM/RF network.

23. The non-transitory computer-readable medium of claim 17, wherein the electronic device is a standalone (non-DOCSIS) electronic device, the broadband network is an HFC network, and the instructions when executed by the processor cause the electronic device to perform operations further comprising:
  communicating with a DOCSIS gateway device, which communicates with a cable modem termination system (CMTS) via the HFC network, over the LAN via a wired/wireless LAN interface including one or more Ethernet ports, one or more Wi-Fi radios, or combinations thereof, to receive MPEG/IP single program transport streams (SPTSs) or a multi-program transport stream (MPTS) from the IP multicast;

multiplexing the received MPEG/IP SPTSs into a final MPTS directed to one or more QAM channels;

modulating and upconverting the received MPTS or the final MPTS on the one or more QAM channels via a QAM modulator of the electronic device; and transmitting the one or more QAM channels output from the QAM modulator to the STBs over an in-home QAM/RF network via an RF f-connector for the in-home QAM/RF network.

24. The non-transitory computer-readable medium of claim 17, wherein the electronic device is a standalone (non-xPON) electronic device, the broadband communication network is an xPON, and the instructions when executed by the processor cause the electronic device to perform operations further comprising:

communicating with an optical network terminal (ONT), which communicates with an optical line terminal (OLT) via the xPON, over the LAN via a wired/wireless LAN interface including one or more Ethernet ports, one or more Wi-Fi radios, or combinations thereof, to receive MPEG/IP single program transport streams (SPTSs) or a multi program transport stream (MPTS) from the IP multicast;

multiplexing the received MPEG/IP SPTSs into a final MPTS directed to one or more QAM channels;

modulating and upconverting the received MPTS or the final MPTS on the one or more QAM channels; and transmitting the one or more QAM channels output from the QAM modulator to the STBs over an in-home QAM/RF network via an RF f-connector for the in-home QAM/RF network.

25. An electronic device for delivering content to digital video broadcasting (DVB) or advanced television systems committee (ATSC) set-top boxes (STBs), the electronic device comprising:

a memory storing instructions; and a processor configured to execute the instructions to:
identify a DVB or ATSC channel from a bank of DVB or ATSC modulator channels of the electronic device that has spare capacity to transmit a MPEG/DVB program stream or a MPEG/ATSC program stream for a program N, and a unique MPEG program number corresponding to the program N;

join an IP multicast from a broadband network that includes the program N, and set up DVB or ATSC modulation to send the program N on a target frequency corresponding to the identified DVB or ATSC channel;

transmit the target frequency to the STBs, wherein transmitting the target frequency notifies the STBs of the target frequency to which the STB is to be tuned and the program N to look for; and transmit the MPEG/DVB program stream or the MPEG/ATSC program stream for the program N to the STBs on the target frequency corresponding to the identified DVB or ATSC channel.

26. The electronic device of claim 25, wherein the electronic device is remotely controlled or configured locally to:
deliver a defined set of "always on" channels to the STBs over an RF f-connector for an in-home DVB/RF network or an in-home ATSC/RF network, without requiring a request from the STBs; and transmit an update for the defined set of "always on" channels to the STBs via the RF f-connector for the in-home DVB/RF network or the in-home ATSC/RF network in response to a change in an MPEG/DVB channel lineup or an MPEG/ATSC channel lineup.

27. The electronic device of claim 25, further comprising:
a multiplexer configured to multiplex MPEG/IP single program transport streams (STPSs) received over the broadband network from the IP multicast into a final multiple program transport stream (MPTS) directed to one or more DVB or ATSC channels;

a DVB or ATSC modulator configured to modulate and upconvert the final MPTS on the one or more DVB or ATSC channels; and an RF f-connector for an in-home DVB/RF network or an in-home ATSC/RF network, wherein the electronic device is configured to transmit the one or more DVB or ATSC channels output from the DVB or ATSC modulator to the STBs over the in-home DVB/RF network or the in-home ATSC/RF network via the RF f-connector.

28. The electronic device of claim 25, further comprising:
a DVB or ATSC modulator configured to modulate and upconvert an MPEG/IP multi program transport stream (MPTS) received over the broadband network from the IP multicast on one or more DVB or ATSC channels; and an RF f-connector for an in-home DVB/RF network or an in-home ATSC-RF network, wherein the electronic device is configured to transmit the one or more DVB or ATSC channels output from the DVB or ATSC modulator to the STBs over the in-home DVB/RF network or the in-home ATSC/RF network via the RF f-connector.

* * * * *